(12) United States Patent
Yao et al.

(10) Patent No.: US 12,038,791 B2
(45) Date of Patent: Jul. 16, 2024

(54) AUXILIARY DISPLAY SYSTEM

(71) Applicant: MOBILE PIXELS INC., Irwindale, CA (US)

(72) Inventors: Xiaoliang Yao, Burlington, MA (US); Wenglong Ng, Burlington, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 54 days.

(21) Appl. No.: 17/237,511

(22) Filed: Apr. 22, 2021

(65) Prior Publication Data

US 2021/0333839 A1 Oct. 28, 2021

Related U.S. Application Data

(60) Provisional application No. 63/015,054, filed on Apr. 24, 2020.

(51) Int. Cl.
*G06F 1/16* (2006.01)

(52) U.S. Cl.
CPC .......... *G06F 1/1681* (2013.01); *G06F 1/1647* (2013.01)

(58) Field of Classification Search
CPC ..... G06F 1/1681; G06F 1/1647; G06F 1/1618
See application file for complete search history.

(56) References Cited

U.S. PATENT DOCUMENTS

| | | | | |
|---|---|---|---|---|
| 6,266,241 B1 * | 7/2001 | Van Brocklin | ....... | G06F 1/1669 361/679.55 |
| 6,532,146 B1 * | 3/2003 | Duquette | .............. | G06F 1/1607 361/679.04 |
| 6,667,878 B2 * | 12/2003 | Ponx | ..................... | G06F 1/1649 361/679.04 |
| 7,136,282 B1 * | 11/2006 | Rebeske | ............... | G06F 1/1654 361/679.55 |
| 7,633,744 B2 * | 12/2009 | Kuhn | .................... | G06F 1/1622 361/679.04 |
| 7,889,481 B2 * | 2/2011 | Mickey | ............... | F16M 11/126 361/679.04 |
| 8,488,306 B2 * | 7/2013 | Mickey | ............... | F16M 13/022 361/679.04 |
| 8,608,119 B2 * | 12/2013 | Wolff | ................. | F16M 11/2021 248/292.11 |
| 9,207,722 B2 * | 12/2015 | Ergun | ................... | G06F 1/1632 |
| 9,660,466 B2 * | 5/2017 | Ergun | ..................... | G06F 1/189 |
| 11,416,024 B2 * | 8/2022 | Bryant | .................. | G06F 1/1632 |
| 2003/0142469 A1 * | 7/2003 | Ponx | ..................... | G06F 1/1616 361/679.04 |
| 2003/0218577 A1 * | 11/2003 | Wang | .................... | G06F 1/1616 345/1.3 |

(Continued)

*Primary Examiner* — Imani N Hayman
*Assistant Examiner* — Theron S Milliser
(74) *Attorney, Agent, or Firm* — Lando & Anastasi, LLP

(57) ABSTRACT

According to an aspect of the disclosure, an auxiliary display system is provided comprising a mount, one or more coupling elements coupled to the mount and configured to be coupled to a computing device configured to rotate about a first rotation axis, and a display portion including a communications interface configured to be communicatively coupled to the computing device, a display screen configured to display output information, and at least one hinge enabling the display portion to be capable of rotating about a second rotation axis, the second rotation axis being parallel to the first rotation axis.

20 Claims, 34 Drawing Sheets

(56) References Cited

U.S. PATENT DOCUMENTS

| | | | | |
|---|---|---|---|---|
| 2004/0051679 | A1* | 3/2004 | Ponx | G06F 1/1679 |
| | | | | 345/1.1 |
| 2006/0108483 | A1* | 5/2006 | Wolff | G06F 1/1632 |
| | | | | 248/122.1 |
| 2006/0268500 | A1* | 11/2006 | Kuhn | G06F 1/1649 |
| | | | | 361/679.04 |
| 2007/0080892 | A1* | 4/2007 | Rebeske | G06F 1/1654 |
| | | | | 345/1.2 |
| 2009/0122474 | A1* | 5/2009 | Mickey | F16M 11/126 |
| | | | | 361/679.04 |
| 2011/0043990 | A1* | 2/2011 | Mickey | G06F 1/1601 |
| | | | | 361/679.04 |
| 2011/0228463 | A1* | 9/2011 | Matagne | G06F 1/1649 |
| | | | | 361/679.04 |
| 2013/0279106 | A1* | 10/2013 | Ergun | F16M 11/24 |
| | | | | 361/679.26 |
| 2020/0371563 | A1* | 11/2020 | Collins | H05K 7/16 |
| 2021/0080999 | A1* | 3/2021 | Bryant | G06F 1/1641 |

* cited by examiner

AUXILIARY DISPLAY SYSTEM

CROSS-REFERENCE TO RELATED APPLICATION

This application claims priority under 35 U.S.C. § 119(e) to U.S. Provisional Application Ser. No. 63/015,054, titled "AUXILIARY DISPLAY SYSTEM," filed on Apr. 24, 2020, which is hereby incorporated by reference in its entirety.

FIELD OF TECHNOLOGY

The disclosure relates to electronic device display systems in general, and more particularly, to auxiliary electronic device display systems.

SUMMARY

Aspects and examples disclosed herein relate to an auxiliary display comprising a mount, one or more coupling elements coupled to the mount and configured to be coupled to a computing device having hinges that enable rotation of the computing device about a first hinge axis, and a display portion including a communications interface configured to be communicatively coupled to the computing device, a display screen configured to display output information, and at least one hinge enabling the display portion to be capable of rotating about a second hinge axis, the second hinge axis being parallel to the first hinge axis.

In some examples, the computing device is a laptop computer. In various examples, each coupling element of the one or more coupling elements includes an adhesive side coupled to the mount, and a magnetic side configured to be removably coupled to the computing device. In at least one example, the communications interface includes a wired communications port. In some examples, the wired communications port is one of a USB-A connection, a USB-C connection, a Micro-USB connection, and a Mini-USB connection. In various examples, the display screen is further configured to receive input information from a user. In at least one example, the mount is rotatably coupled to the display portion by the at least one hinge. In some examples, the display portion is configured to rotate at least 270° about the at least one hinge. In various examples, the mount includes a beveled edge that is beveled at a bevel angle relative to an axis orthogonal to the first and second hinge axes. In at least one example, the display portion is configured to rotate about the at least one hinge by up to 270° plus the bevel angle.

According to at least one aspect, an auxiliary display system is provided comprising a computing device including a first communications interface, a primary display screen, a backplane surface, and at least one computing device hinge enabling rotation of the primary display screen about a first hinge axis, and an auxiliary display including a mount configured to be coupled to the backplane surface of the computing device, a second communications interface configured to be communicatively coupled to the first communications interface, at least one auxiliary display screen configured to display output information, and being configured to be rotatably coupled to the mount such that the display portion is capable of rotating about a second hinge axis relative to the mount, the second hinge axis being parallel to the first hinge axis.

In some examples, the auxiliary display includes a tablet computer. In various examples, the first communications interface is one of a USB-A connection, a USB-C connection, a Micro-USB connection, and a Mini-USB connection. In at least one example, the auxiliary display further includes one or more coupling elements, and wherein each coupling element of the one or more coupling elements includes an adhesive side coupled to the mount, and a magnetic side configured to be removably coupled to the computing device. In some examples, the second communications interface includes a wired communications port. In various examples, the wired communications port is one of a USB-A connection, a USB-C connection, a Micro-USB connection, and a Mini-USB connection.

In at least one example, the auxiliary display further comprises at least one auxiliary device hinge enabling rotation of the at least one auxiliary display screen about the first and second hinge axes relative to the mount. In some examples, the at least one auxiliary display screen is configured to rotate at least 270° about the at least one auxiliary device hinge relative to the mount. In various examples, the mount includes a beveled edge that is beveled at a bevel angle relative to an axis orthogonal to the first and second hinge axes. In at least one example, the at least one auxiliary display screen is configured to rotate about the at least one auxiliary device hinge by up to 270° plus the bevel angle.

According to at least one example, an auxiliary display system is provided comprising a mount, one or more coupling elements coupled to the mount and configured to be coupled to a computing device configured to rotate about a first rotation axis, and a display portion including a communications interface configured to be communicatively coupled to the computing device a display screen configured to display output information, and at least one hinge enabling the display portion to be capable of rotating about a second rotation axis, the second rotation axis being parallel to the first rotation axis.

In some examples, the at least one hinge is at least one first hinge, and the auxiliary display system further includes a linkage bar rotatably coupled to the display portion about the at least one first hinge and rotatably coupled to the mount about at least one second hinge. In at least one example, the at least one second hinge enables the linkage bar to be capable of rotating about a third rotation axis, the third rotation axis being parallel to the first rotation axis and the second rotation axis. In various examples, the auxiliary display system further comprises a support rotatably coupled to the mount about at least one third hinge. In some examples, the support is configured to exert a moment about the computing-device hinges opposite a gravitational moment about the computing-device hinges. In at least one example, the at least one third hinge enables the support to be capable of rotating about a fourth rotation axis, the fourth rotation axis being parallel to the first rotation axis, the second rotation axis, and the third rotation axis.

In various examples, the mount includes at least one first coupling element and the linkage bar includes at least one second coupling element configured to couple to the at least one first coupling element. In some examples, the at least one first coupling element and the at least one second coupling element each include at least one magnet. In at least one example, the at least one hinge is at least one first hinge, the auxiliary display system further includes a support rotatably coupled to the mount about at least one second hinge. In various examples, the support is configured to exert a moment about the computing-device hinges opposite a gravitational moment about the computing-device hinges. In some examples, the at least one second hinge enables the support to be capable of rotating about a third rotation axis, the third rotation axis being parallel to the first rotation axis and the second rotation axis.

According to some aspects, a method of facilitating use of an auxiliary display system is provided, the method comprising providing an auxiliary display including a mount, one or more coupling elements coupled to the mount and configured to be coupled to a computing device configured to rotate about a first rotation axis, and a display portion including a communications interface configured to be communicatively coupled to the computing device, a display screen configured to display output information, and at least one hinge enabling the display portion to be capable of rotating about a second rotation axis, the second rotation axis being parallel to the first rotation axis, instructing a user of the auxiliary display to establish a communicative connection between the communications interface and the computing device, and instructing the user of the auxiliary display to couple the one or more coupling elements to the computing device.

In some examples, the at least one hinge is at least one first hinge, and the auxiliary display further comprises a linkage bar rotatably coupled to the display portion about the at least one first hinge and rotatably coupled to the mount about at least one second hinge which enables rotation about a third rotation axis, and the method further includes instructing the user of the auxiliary display to rotate the display portion about the second rotation axis via the at least one first hinge. In various examples, the method includes instructing the user of the auxiliary display to rotate the display portion about the third rotation axis via the at least one second hinge, wherein the third rotation axis is parallel to the first rotation axis and the second rotation axis. In at least one example, the auxiliary display further comprises a support rotatably coupled to the mount via at least one third hinge enabling rotation about a fourth rotation axis parallel to the first rotation axis, the second rotation axis, and the third rotation axis, and the method further includes instructing the user of the auxiliary display to rotate the support about the fourth rotation axis via the at least one third hinge.

In various examples, the mount includes at least one first coupling element and the linkage bar includes at least one second coupling element configured to couple to the at least one first coupling element, and the method further includes instructing the user to removably couple the mount to the linkage bar via the at least one first coupling element and the at least one second coupling element. In at least one example, instructing the user to removably couple the mount to the linkage bar via the at least one first coupling element and the at least one second coupling element includes instructing the user to rotate at least one of the linkage bar or the mount about the third rotation axis via the at least one second hinge.

According to various aspects, an auxiliary display system is provided comprising a computing device including a first communications interface, a primary display screen, a backplane surface, and at least one computing device hinge enabling rotation of the primary display screen about a first rotation axis, and an auxiliary display including a mount configured to be coupled to the backplane surface of the computing device, a second communications interface configured to be communicatively coupled to the first communications interface, at least one auxiliary display screen configured to display output information, and being configured to be rotatably coupled to the mount such that the display portion is capable of rotating about a second rotation axis relative to the mount, the second rotation axis being parallel to the first rotation axis.

In various examples, the at least one hinge is at least one first hinge, the auxiliary display system further includes a support rotatably coupled to the mount about at least one second hinge, wherein the support is configured to exert a moment about the computing-device hinges opposite a gravitational moment about the computing-device hinges, and wherein the at least one second hinge enables the support to be capable of rotating about a third rotation axis, the third rotation axis being parallel to the first rotation axis and the second rotation axis. In at least one example, the at least one hinge is at least one first hinge, and the auxiliary display further includes a linkage bar rotatably coupled to the at least one auxiliary display screen about the at least one first hinge and rotatably coupled to the mount about at least one second hinge.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1A:
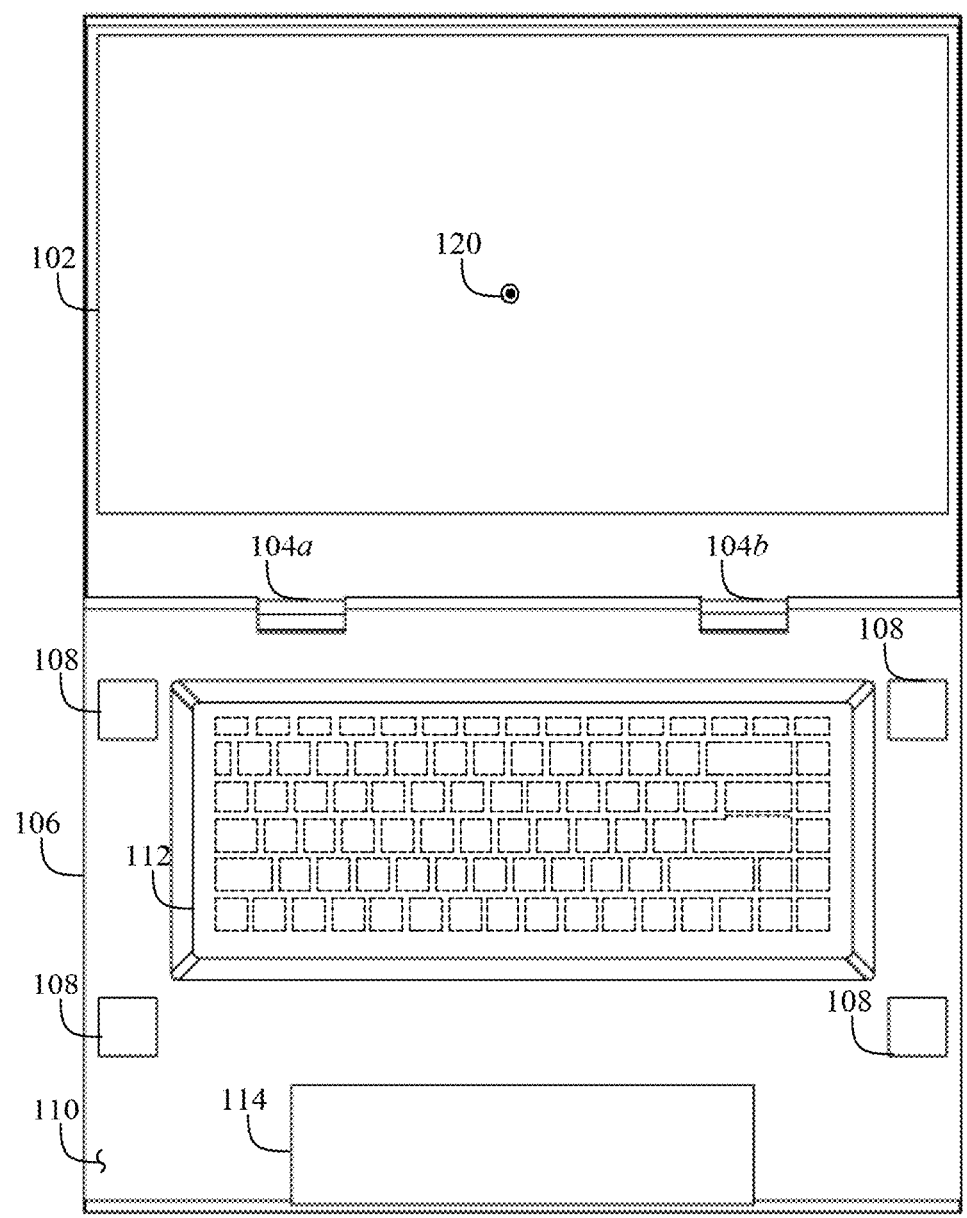
FIG. 1A illustrates a front view of an auxiliary display system in an open position according to one example.

Conventional laptop computers generally include a display screen to provide output information to a user. A size of the display screen is determined at least partially for the purpose of optimizing user enjoyment. For example, users may value laptop computers for their compactness and portability, which may require a reduction in display screen size. However, users also value display screens that are sufficiently large for the user to comfortably view displayed information. Accordingly, there is an inherent tension in selecting a display screen size for laptop computers having a single screen.

Design tensions associated with the implementation of a single screen may be circumvented with the addition of a second, auxiliary display system communicatively coupled to the laptop computer. For example, a second, auxiliary display system may be removably physically coupled to a backplane of a primary laptop screen. In use, a user may rotate or otherwise reposition an auxiliary screen from a closed state and orient the auxiliary screen in a desired orientation. For example, the auxiliary screen may be rotated to face the user from a position above the laptop computer screen from the perspective of the user. A user may alternately maintain the auxiliary screen in a closed state such that information may be provided to another entity.

Adding a second, auxiliary display system coupled to the backplane of the primary laptop screen avoids many of the design tradeoffs associated with increasing the size of a single screen. Modern laptop computer display screens are typically significantly larger in screen area than in screen thickness. Accordingly, whereas increasing the area of a single display screen yields a proportional increase in the amount of information conveyed by the display screen, adding a second, auxiliary display system affixed to the backplane of the primary display screen provides approximately twice as much information at the cost of a relatively small increase in thickness. The addition of a second, auxiliary display system therefore yields a significant increase in information density (that, the amount of information conveyed relative to the physical footprint of the laptop computer) compared to increasing the size of a single primary laptop screen.

The auxiliary display system may be oriented in various orientations, including a closed orientation, an open orientation, a standing orientation, a laptop orientation, or a cantilevered orientation. In a closed orientation, an auxiliary screen may face away from the user, approximately anti-parallel from the primary laptop screen. For example, the closed orientation may be beneficial where the user does not desire to view the auxiliary screen, or desires to display information to a viewer across from the user.

In one example of an open orientation, the auxiliary screen may be rotated to face the user, approximately parallel with the primary laptop screen. For example, one example of the open orientation may be beneficial where the user wishes to view both the primary laptop screen and the second, auxiliary screen simultaneously. In a standing orientation, the auxiliary display system may be physically separated from the laptop computer and may stand independently from the laptop computer as a bipod formed by two portions of the second, auxiliary display system. For example, the standing orientation may be beneficial where the user wishes to view both the primary laptop screen and the second, auxiliary display system next to one another as physically separated devices.

In a laptop orientation, the auxiliary display system may be physically separated from the laptop computer and may stand independently from the laptop computer in a manner similar to the laptop computer. The auxiliary display system may include a mount portion lying co-planar with a surface on which the auxiliary display system is placed, and a display portion rotatable about the mount portion to display information to a user. The mount portion may include a keyboard and/or pointing input device to receive user inputs. The laptop orientation may be beneficial where the user wishes to use the auxiliary display system as a laptop computer. For example, the laptop orientation may be particularly beneficial where the auxiliary display system is coupled to a device, such as a mobile communication device, configured to execute an operating system for the auxiliary display system.

In a cantilevered orientation, the auxiliary display system may be physically separated from the laptop computer and may stand independently from the laptop computer in a manner similar to the laptop orientation. For example, the auxiliary display system may include a mount portion lying co-planar with a surface on which the auxiliary display system is placed, and a display portion rotatable about the mount portion to display information to a user. However, whereas the back surface of the mount portion may face the surface on which the auxiliary display system is placed in the laptop orientation, in the cantilevered orientation the front surface of the mount portion may face the surface on which the auxiliary display system is placed. For example, the cantilevered orientation may be particularly beneficial where the user does not desire to use certain user input functionality, such as a keyboard and pointing device, but wishes to view information displayed by the auxiliary display system.

In various examples, an auxiliary screen system may be implemented in connection with an electronic device other than a laptop computer. For example, the auxiliary screen system may be implemented in connection with a mobile electronic device, such as a smartphone, a gaming console, or another type of electronic device. In addition to displaying information provided by the electronic device, the auxiliary screen system may provide additional functionality when coupled to the electronic device. For example, the auxiliary screen system may include a keyboard and/or touch-sensitive pad or screen and execute functionality similar to that of a laptop computer.

Figure 1B:
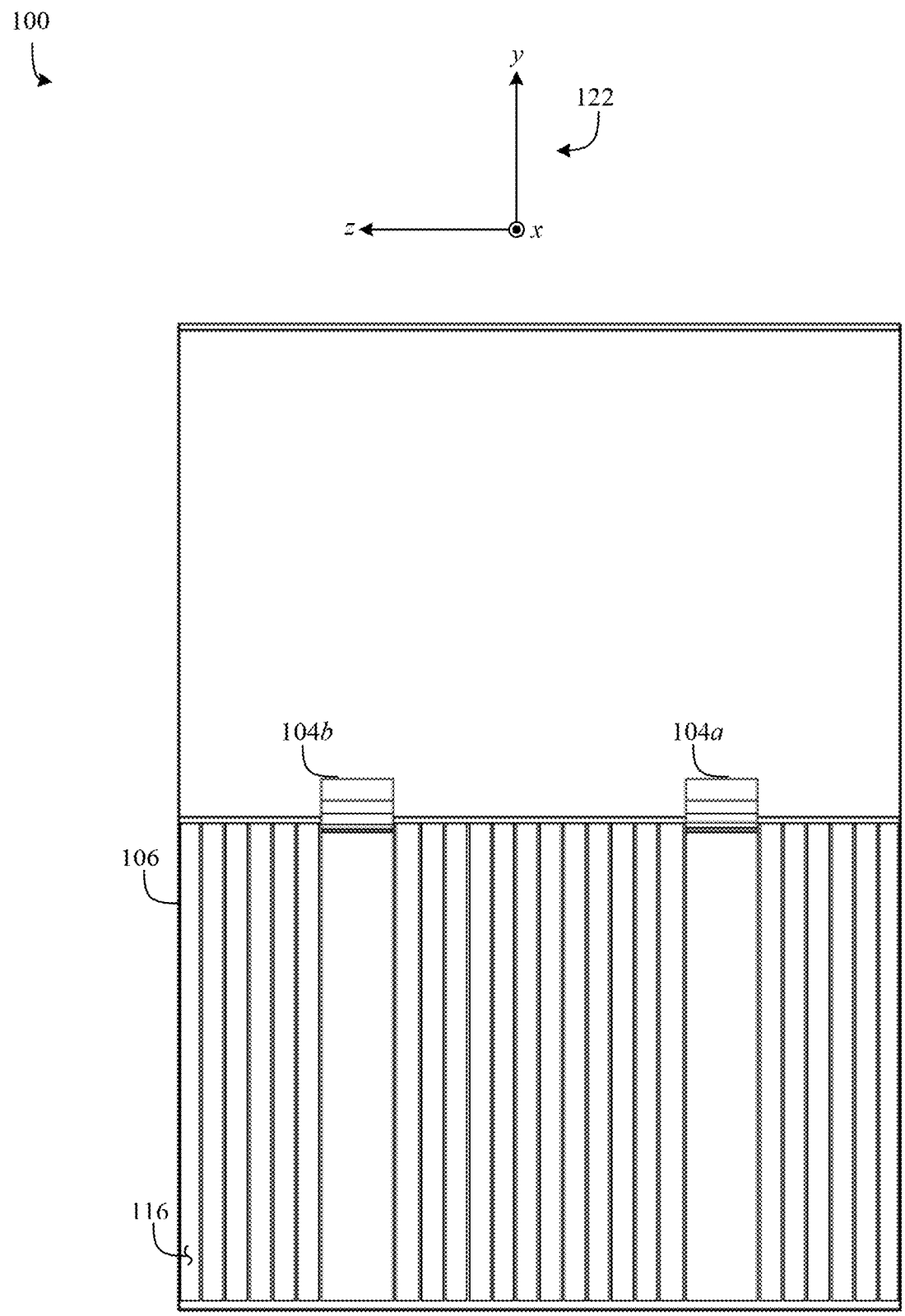
FIG. 1B illustrates a back view of the auxiliary display system in the open position according to one example.
Figure 1C:
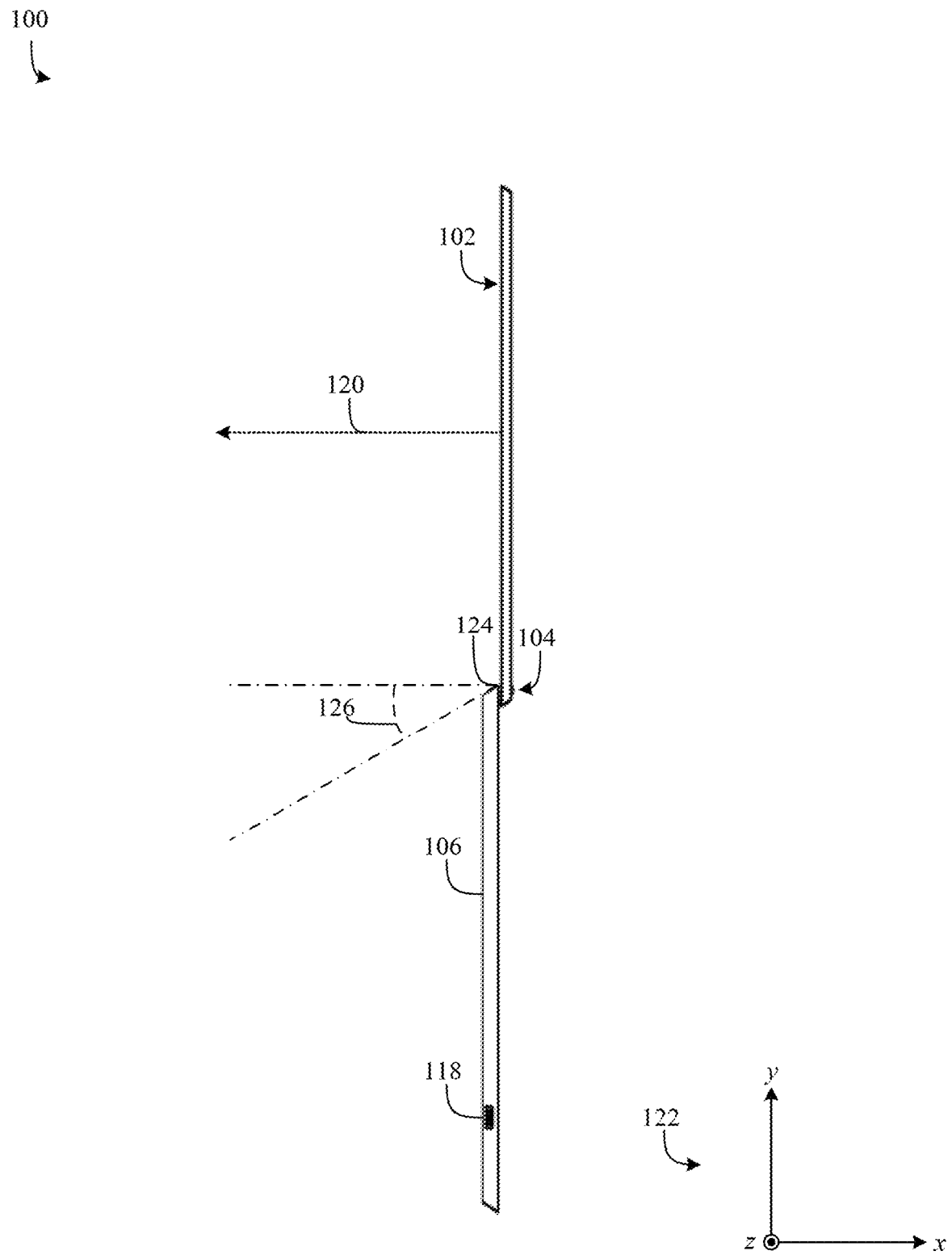
FIG. 1C illustrates a side view of the auxiliary display system in the open position according to one example.

FIG. 1A illustrates a front view of an auxiliary display system 100 in an open position according to one example. FIG. 1B illustrates a back view of the auxiliary display system 100 in the open position according to one example. FIG. 1C illustrates a side view of the auxiliary display system 100 in the open position according to one example.

The auxiliary display system 100 includes a display portion 102, a first hinge 104a and a second hinge 104b (collectively, "hinges 104"), a mount 106, coupling elements 108, a front surface 110, a first input portion 112, a second input portion 114, a back surface 116, and a wired connection port 118. As discussed in greater detail below, the auxiliary display system 100 may be configured to be coupled to another electronic device. In some examples, the auxiliary display system 100 may be physically coupled to another electronic device via the coupling elements 108, and may be communicatively and/or electrically coupled to the electronic device via the wired connection port 118. In other examples, the auxiliary display system 100 may be communicatively and/or electrically coupled to another electronic device via the wired connection port 118, but may not be physically coupled to the electronic device except for the connection via the wired connection port 118. In still other examples, the auxiliary display system 100 may be communicatively and/or electrically coupled to another electronic device via a wireless communicate interface in addition to, or in lieu of, a wired connection, such as by being wirelessly coupled according to a Wi-Fi wireless communication protocol, a Bluetooth wireless communication protocol, and so forth. As used herein, a "communications interface" may include a wired communication interface, such as the wired connection port 118, a wireless communications interface, a combination of both, and so forth.

The display portion 102 is configured to display information for viewing by a user along an auxiliary display axis 120, which is normal to a surface of the display portion 102 and antiparallel to an x-axis of a legend 122. For example, the display portion 102 may include a display screen, such as a liquid-crystal display screen, configured to display information to a user. The displayed information may be provided to the auxiliary display system 100 by another electronic device communicatively coupled to the auxiliary display system 100 via the wired connection port 118. In some examples, the display portion 102 is also configured to receive input information including, for example, touch inputs from a user's finger, inputs from a stylus operated by a user, and so forth. For example, the display portion 102 may include a touch-sensitive display screen configured to receive user inputs from the user. In some examples, the display portion 102 may include a tablet computer.

The hinges 104 are configured to enable the display portion 102 to rotate relative to the mount 106. More particularly, the hinges 104 may enable the display portion 102 to rotate about the z-axis indicated by the legend 122, also referred to herein as a "hinge axis" or a "rotation axis." Rotation of the display portion 102 enables a user to orient the display portion 102 in a desired orientation, such as by rotating the display portion 102 to face the user or to face another person.

For example, the hinges 104 may enable the display portion 102 to rotate 180° clockwise (that is, −180° with reference to a right-handed coordinate system) about the z-axis from the position shown in FIG. 1C to a closed position. The closed position may be particularly advantageous where the user wishes to display information on the display portion to a person facing the user.

The hinges 104 may further enable the display portion 102 to rotate at least 90° counterclockwise (or 90° with reference to a right-handed coordinate system) about the z-axis from the position shown in FIG. 1C such that the auxiliary display axis 120 is antiparallel to the y-axis. In some examples, the display portion 102 may rotate counterclockwise beyond the x-axis. For example, a top edge 124 of the mount 106 may be beveled at a bevel angle 126 relative to the x-axis. The hinges 104 may enable the display portion 102 to rotate counterclockwise about the z-axis past the x-axis by a number of degrees equal to the bevel angle 126.

The mount 106 is configured to facilitate positioning and/or orienting the auxiliary display system 100 in a desired position and/or orientation. The auxiliary display system 100 may be positioned and/or oriented in various implementations, as illustrated below with respect to FIGS. 2A-6. For example, where the auxiliary display system 100 is configured to be mounted to a backplane of a laptop computer, as discussed in greater detail below with respect to FIGS. 2A-3B, the mount 106 is configured to facilitate mounting the auxiliary display system 100 to the backplane of the laptop computer. In other implementations, such as implementations in which the auxiliary display system 100 is not mounted directly to an electronic device and is instead placed on a surface, such as a desk, the mount 106 may enable the auxiliary display system 100 to be positioned and/or oriented as desired by a user, as discussed in greater detail below with respect to FIGS. 4-6.

The coupling elements 108 are coupled to the front surface 110 of the mount 106, and are configured to enable the auxiliary display system 100 to be coupled to a surface or device, such as a laptop computer. For example, the coupling elements 108 may include adhesive magnets having an adhesive side and a magnetic side. In one example, the adhesive side may include a chemical substance that binds one or more objects together and resists the objects' physical separation, such as glue. The adhesive side may be coupled to the front surface 110 of the mount 106, and the magnetic side may be configured to be removably coupled to a corresponding magnetic surface. For example, an electronic device to which the auxiliary display system 100 is capable of being coupled, such as a laptop computer, may include corresponding magnetic elements with which the respective magnetic surfaces of the coupling elements 108 may form a magnetic bond. In other examples, the coupling elements 108 may include one or more alternate coupling elements, such as adhesives, snaps, hook-and-loop, or any other coupling elements, to form a removable physical connection with another entity. In other examples, an electronic to which the auxiliary display system 100 is capable of being coupled, such as a laptop computer, may include coupling elements substantially similar to the coupling elements 108, and the auxiliary display system 100 may include corresponding coupling elements.

The first input portion 112 and the second input portion 114 (collectively, "input portions 112, 114") are configured to enable a user to provide a user input to the auxiliary display system 100. For example, the first input portion 112 may include a keyboard, and the second input portion 114 may include a pointing device, such as a touch-sensitive pad. The input portions 112, 114 may be particularly advantageous for certain configurations of the auxiliary display system 100, such as examples in which the auxiliary display system 100 functions in a substantially similar manner as a laptop computer. In some examples, the input portions 112, 114 are recessed from the front surface 110 such that the input portions 112, 114 do not protrude beyond the front surface 110.

The wired connection port 118 is configured to be coupled to a wired connection. For example, the wired connection may provide a communicative coupling between the auxiliary display system 100 and another device, such as a laptop computer, tablet computer, mobile electronic device, gaming console, and so forth. The auxiliary display system 100 may receive electrical power from another device via the wired connection port 118, and/or may exchange information with the other device via the wired connection port 118. In some examples, the auxiliary display system 100 may include multiple wired connection ports, including at least one wired connection port on one side of the auxiliary display system 100 and at least one additional wired connection port on an opposite side of the auxiliary display system 100.

The wired connection port 118 may include one or more ports configured according to various standards, including DisplayPort, Mini DisplayPort, HDMI, VGA, DVI, USB-A, USB-C, Micro-USB, Mini-USB, and so forth. In some examples, the wired connection port 118 may be configured according to a standard that is different than the standard of a wired communication port of a device to which the wired connection port 118 is coupled. For example, the wired connection port 118 may be configured according to a USB-A standard, but may be coupled to a device having a wired connection port configured according to a USB-C standard. In some examples, the auxiliary display system 100 may include a wireless communication interface in addition to, or in lieu of, the wired connection port 118.

Figure 2A:
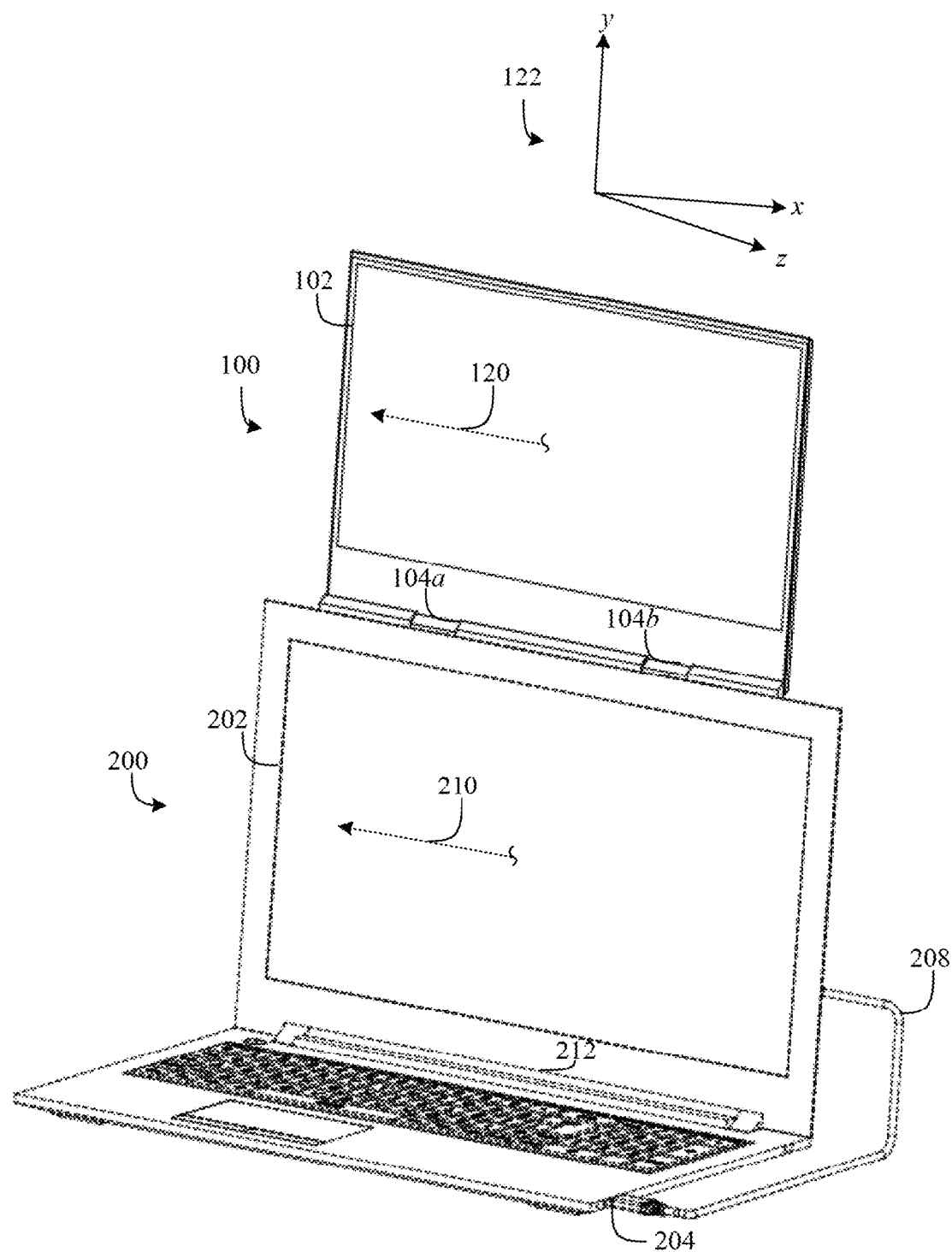
FIG. 2A illustrates a front perspective view of the auxiliary display system coupled to a laptop computer according to an example.
Figure 2B:
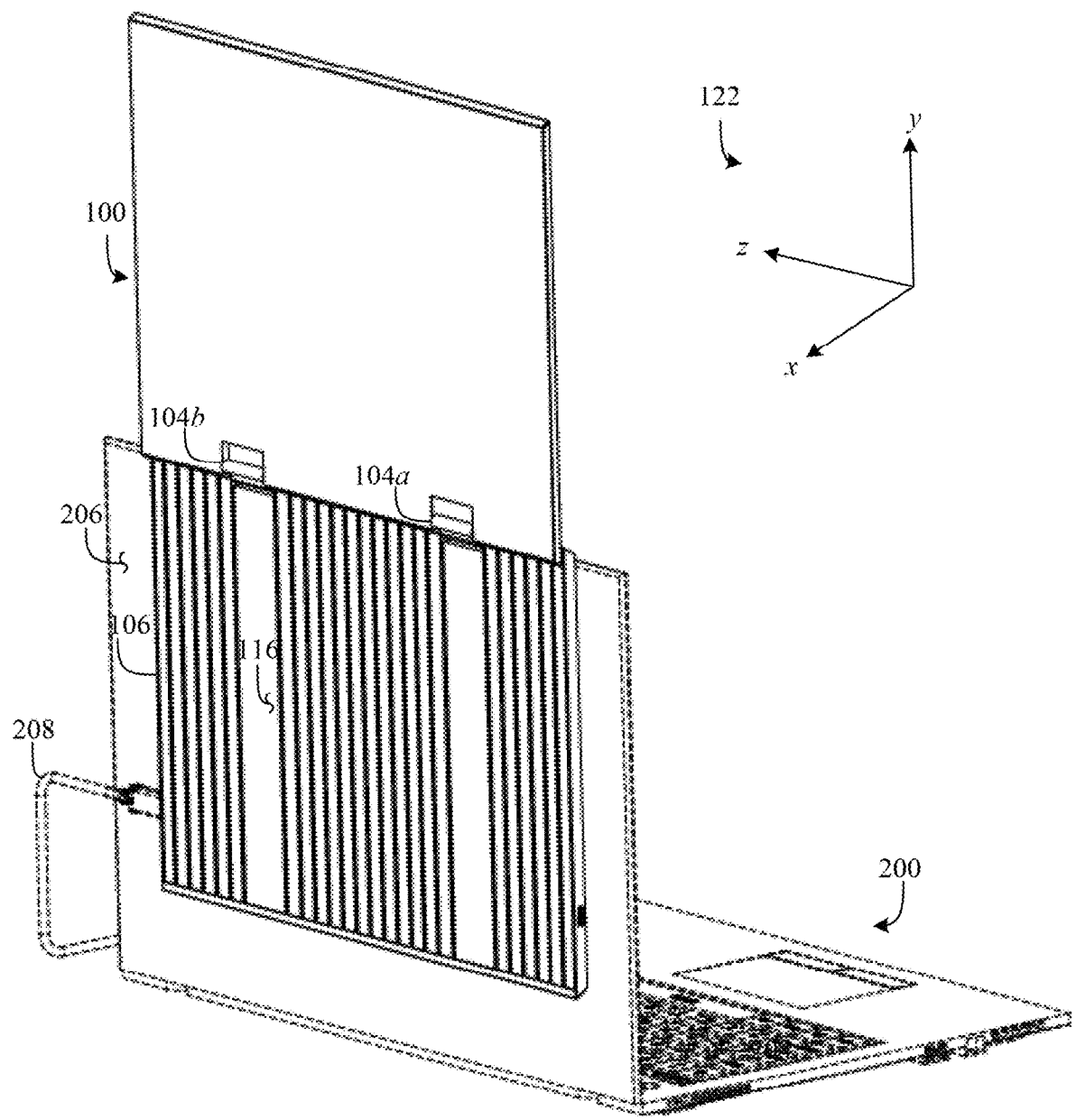
FIG. 2B illustrates a back perspective view of the auxiliary display system coupled to the laptop computer according to an example.

As discussed above, the coupling elements 108 enable the auxiliary display system 100 to be removably coupled to a device, such as a laptop computer. For example, FIG. 2A illustrates a front perspective view of the auxiliary display system 100 coupled to a laptop computer 200 according to an example. FIG. 2B illustrates a back perspective view of the auxiliary display system 100 coupled to the laptop computer 200 according to an example. The laptop computer 200 includes a primary screen 202, a laptop wired connection port 204, and a backplane 206.

The primary screen 202 is configured to display information to a user.

The laptop wired connection port 204 is configured to be coupled to a wired connection to provide a communicative and/or electrical coupling through which information and/or electrical power may be exchanged with another device, such as the auxiliary display system 100, via a wired connection 208. For example, the laptop wired connection port 204 may be configured according to various standards, including DisplayPort, Mini DisplayPort, HDMI, VGA, DVI, USB-A, USB-C, Micro-USB, Mini-USB, and so forth. In some examples, the laptop wired connection port 204 may be configured according to a standard that is different than that of the wired connection port 118. For example, the wired connection port 118 may be configured according to a USB-A standard, the laptop wired connection port 204 may be configured according to a USB-C standard, and the wired connection 208 may be a USB-A-to-USB-C connection to enable information and/or electrical power to be exchanged between the auxiliary display system 100 and the laptop computer 200.

The backplane 206 is a back surface of the laptop computer 200. The backplane 206 may include, or be coupled to, one or more laptop coupling elements (not illustrated) corresponding to the coupling elements 108. For example, where the coupling elements 108 include adhesive magnets, the backplane 206 may include, or be coupled to, magnetic elements that are physically aligned with the coupling elements 108 and have an opposite magnetic polarity of the coupling elements 108 such that each of the coupling elements 108 forms a magnetic bond with a corresponding coupling element on the backplane 206. In another example, the coupling elements 108 may include either a hook or loop material, and the backplane 206 may include, or be coupled to, an opposing loop or hook material to form a physical bond with the coupling elements 108. In other examples, the backplane 206 may include, or be coupled to, alternate coupling elements to pair with the coupling elements 108.

As discussed above, the auxiliary display system 100 may receive information and/or electrical power from the laptop computer 200 via the wired connection 208. The auxiliary display system 100 may enable the display portion 102 to display information responsive to receiving electrical power from the laptop computer 200 via the wired connection 208. As discussed above, the auxiliary display axis 120 may be varied by rotating the display portion 102 about the z-axis via rotation of the hinges 104. Similarly, a primary display axis 210 illustrates an axis along which information is displayed by the primary screen 202. The primary display axis 210 is normal to the plane in which the primary screen 202 lies.

Similar to the auxiliary display axis 120 in the auxiliary display system 100, the primary display axis 210 may be varied by rotating the primary screen 202 about laptop hinges 212. In some examples, an axis along which the laptop hinges 212 enable rotation of the primary screen 202 is parallel to an axis along which the hinges 104 enable rotation of the display portion 102. That is, the laptop hinges 212 and the hinges 104 enable the primary screen 202 and the display portion 102, respectively, to rotate about the same rotation axis, albeit translated in position.

Information displayed by the display portion 102 may be provided by the laptop computer 200. For example, the display portion 102 may function as a second, dual monitor for the laptop computer 200, and the information displayed on the display portion 102 may be provided by the laptop computer 200 based on a program executed by the laptop computer 200 and based on actions performed by a user, such as a user dragging display windows onto the display portion 102. Accordingly, the auxiliary display system 100 may advantageously provide a second, dual monitor for a user such that an amount of displayed information provided by the laptop computer 200 may be increased without significantly altering a physical footprint of the laptop computer 200.

FIGS. 2A and 2B illustrate a configuration in which the display portion 102 and the primary screen 202 display information in a similar orientation. That is, the auxiliary display axis 120 is approximately parallel to the primary display axis 210, each of which is approximately antiparallel to the x-axis. Such an orientation may be particularly advantageous where a user of the laptop computer 200 desires to view information from multiple displays simultaneously, and therefore desires the display axes 120, 210 to be approximately incident on the user's eyes. In alternate examples, the axes 120, 210 may not be parallel to each other nor antiparallel to the x-axis where the user of the laptop computer 200 wishes to view information from multiple displays simultaneously. For example, the axes 120, 210 may be oriented differently such that the axes 120, 210 intersect approximately at a user's eyes.

In some examples, it may be advantageous for information displayed by the display portion 102 and the primary screen 202 to be displayed in substantially different orientations, that is, for the display axes 120, 210 to not be approximately parallel. For example, rather than a user of the laptop computer 200 viewing information from multiple displays simultaneously, the user of the laptop computer 200 may desire to view information from the primary screen 202 while simultaneously displaying information to another entity from the display portion 102.

Figure 3A:
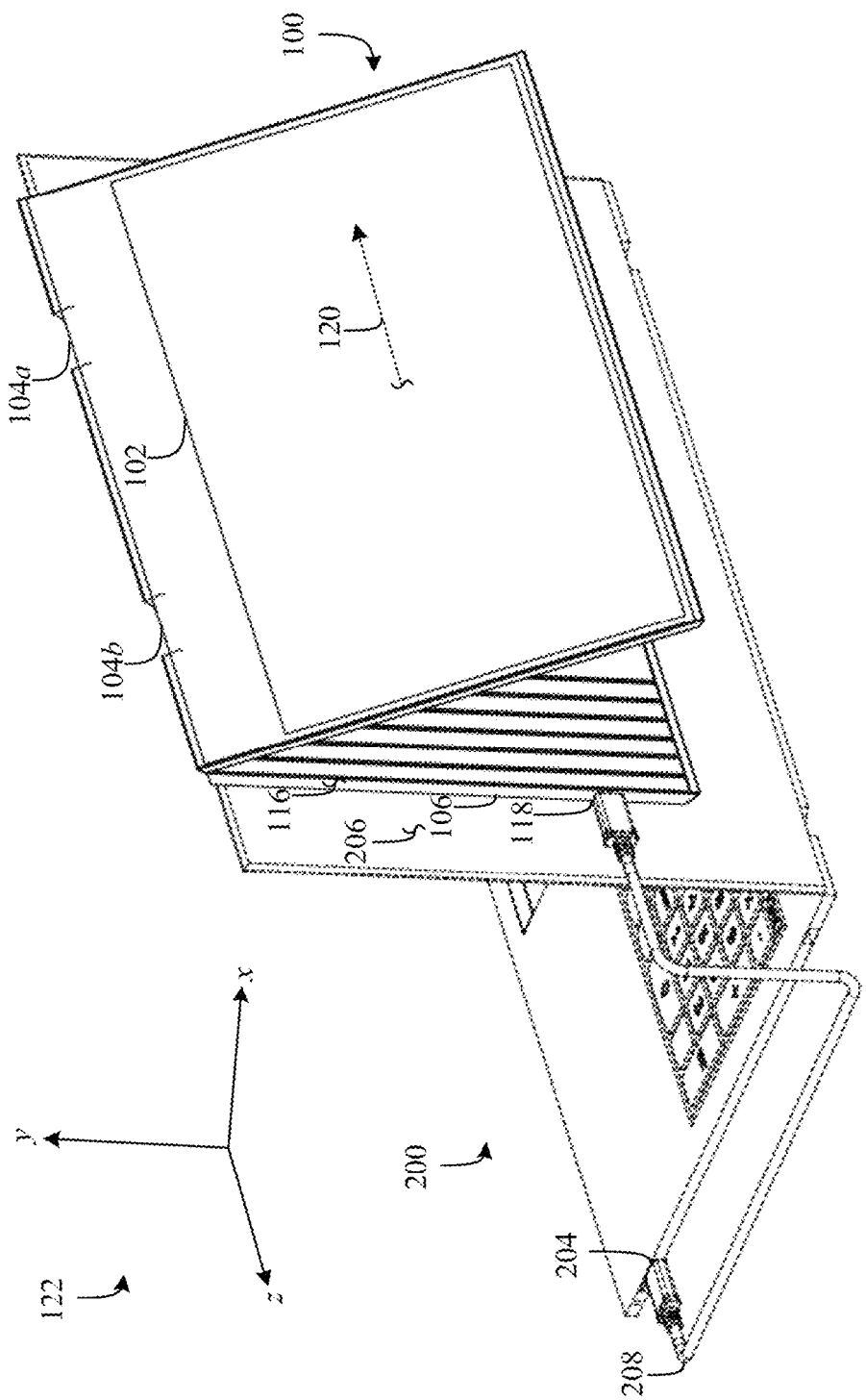
FIG. 3A illustrates a left back perspective view of the auxiliary display system coupled to the laptop computer according to an example.
Figure 3B:
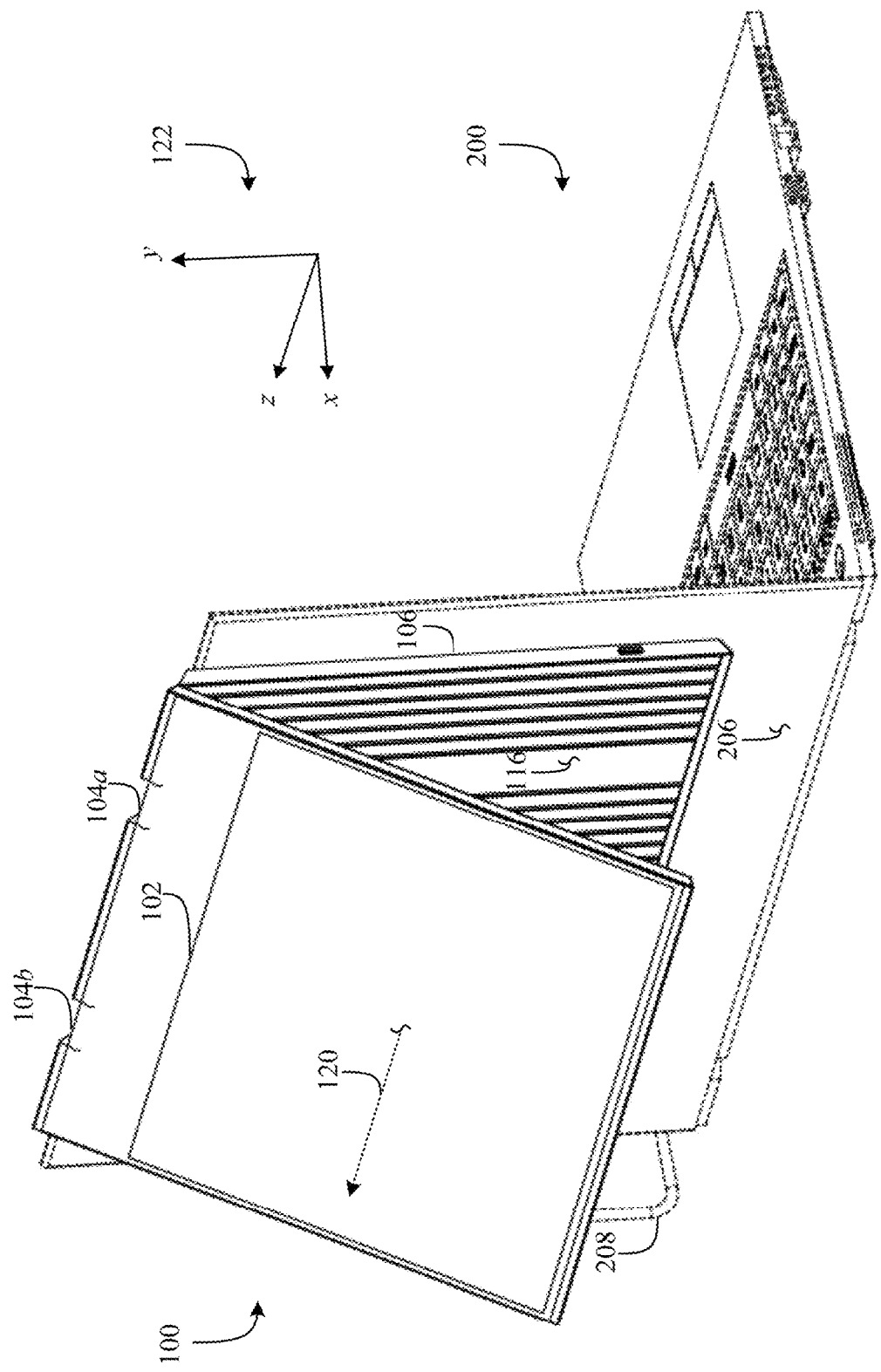
FIG. 3B illustrates a right back perspective view of the auxiliary display system coupled to the laptop computer according to an example.

To display information to another entity from the display portion 102, a user may rotate the display portion 102 about the z-axis by rotating the display portion 102 about the hinges 104. For example, FIG. 3A illustrates a left back perspective view of the auxiliary display system 100 coupled to the laptop computer 200 according to an example. FIG. 3B illustrates a right back perspective view of the auxiliary display system 100 coupled to the laptop computer 200 according to an example.

As illustrated by FIGS. 3A and 3B, the display axes 120, 210 are not approximately parallel. Although the primary display axis 210 has not been changed and therefore remains approximately antiparallel to the x-axis, the auxiliary display axis 120 is closer to being parallel to the x-axis than being antiparallel to the x-axis. Moreover, the display portion 102 is capable of rotating further about the z-axis via the hinges 104 until the auxiliary display axis 120 is antiparallel to the primary display axis 210 and parallel to the x-axis. Accordingly, information is displayed by the auxiliary display system 100 away from a user of the laptop computer 200, which may be particularly advantageous where, for example, the user wishes to display information to a person across from the user. The user of the laptop computer 200 may therefore view information from the primary screen 202 while simultaneously displaying information to a second person across from the user.

In some examples, it may be advantageous to physically decouple the auxiliary display system 100 from another device, such as the laptop computer 200, and only connect the auxiliary display system 100 to the laptop computer 200 via the wired connection 208. The auxiliary display system 100 may be implemented in various configurations while physically decoupled from another device, such as the laptop computer 200, as illustrated in FIGS. 4, 5, and 6.

Figure 4:
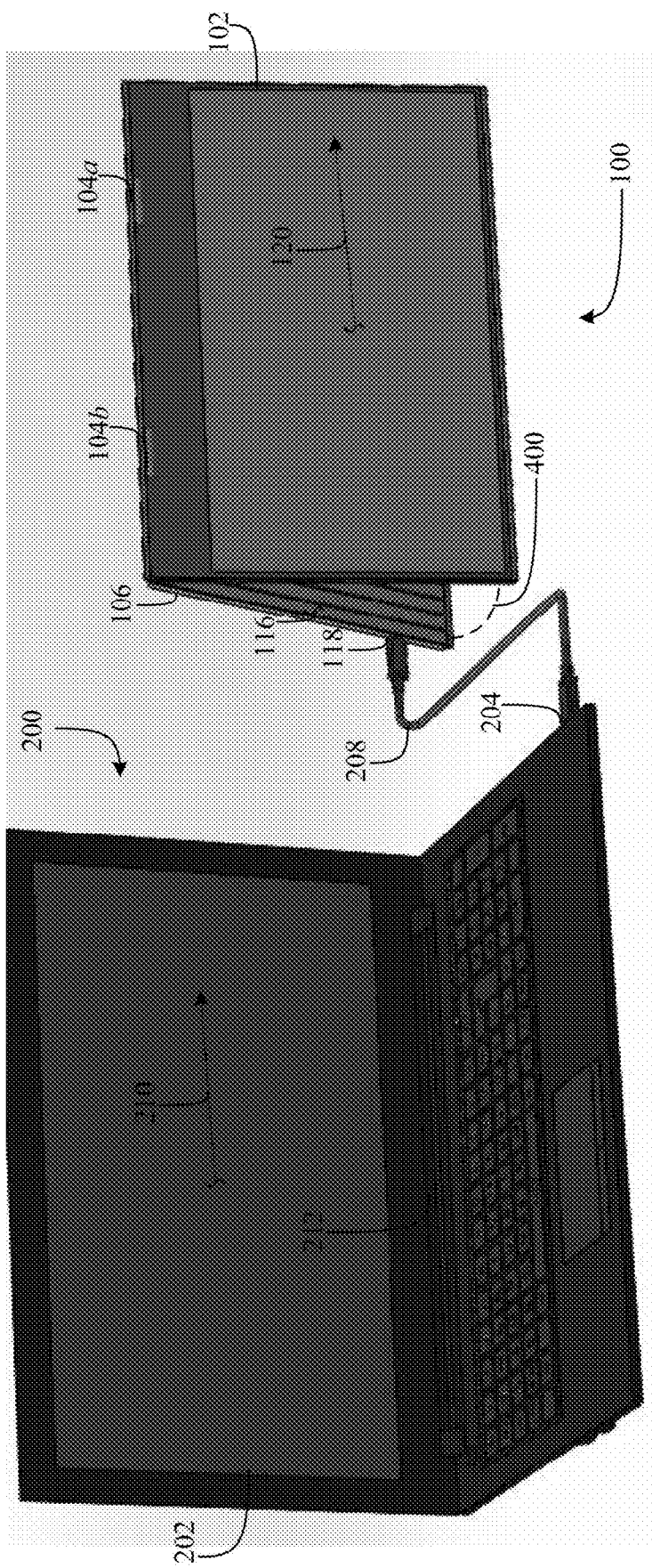
FIG. 4 illustrates a perspective view of the auxiliary display system being physically decoupled from another device according to an example.

FIG. 4 illustrates a perspective view of the auxiliary display system 100 being physically decoupled from another device, in this case the laptop computer 200, according to one example. More particularly, the auxiliary display system 100 is not physically coupled to the backplane 206 of the laptop computer 200 and is communicatively and/or electrically connected to the laptop computer 200 via the wired connection 208. The auxiliary display system 100 is configured in a standing orientation in which the auxiliary display system 100 is disposed in an upright position by the display portion 102 and the mount 106 forming a bipod. The display portion 102 may be rotated relative to the mount 106 about the hinges 104 to alter an angle 400 between the display portion 102 and the mount 106, and thereby alter the trajectory of the auxiliary display axis 120. The auxiliary display system 100 may be placed in substantially any location and in substantially any orientation that is desired by the user in the standing orientation.

Figure 5:
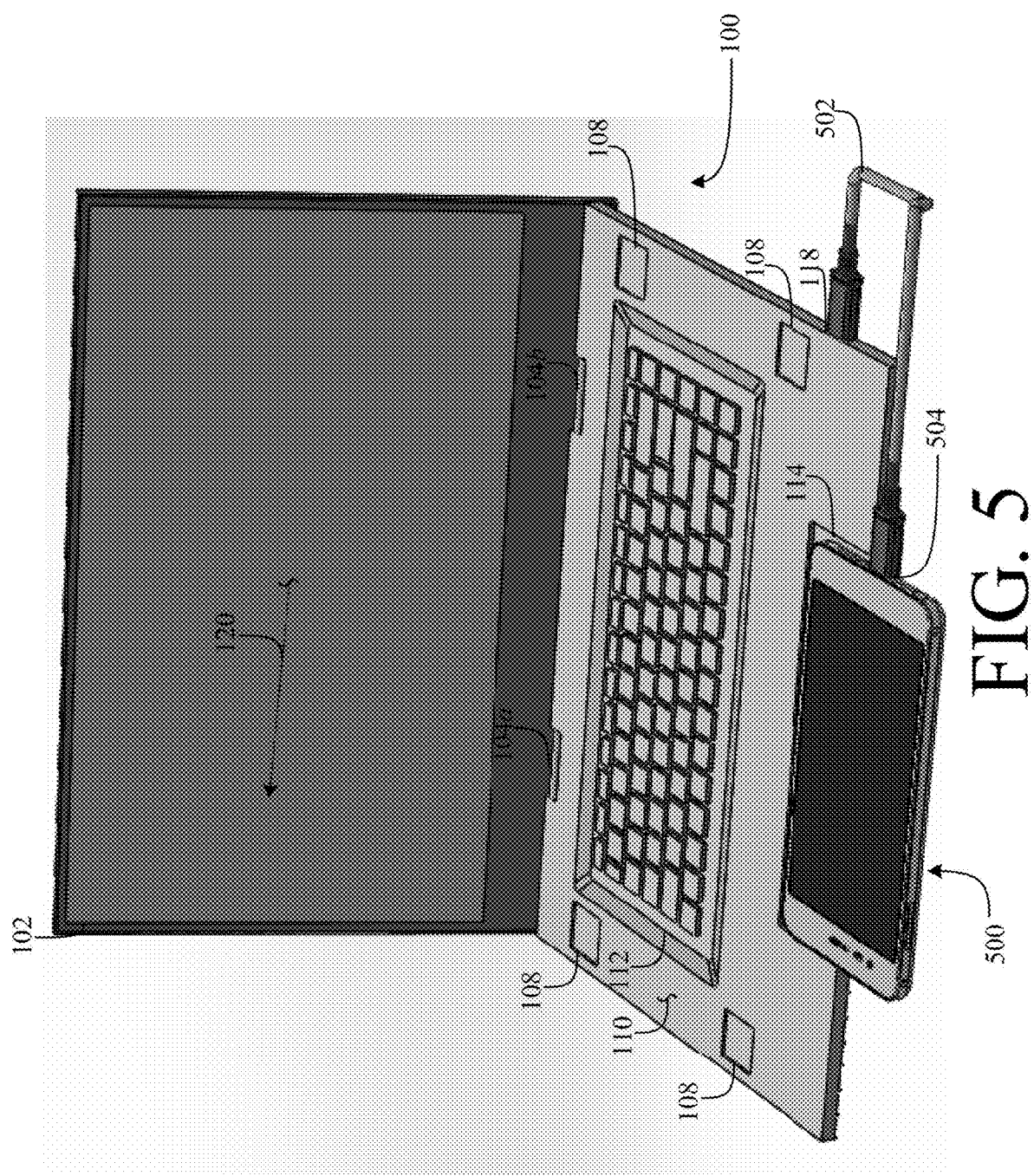
FIG. 5 illustrates a perspective view of the auxiliary display system being physically decoupled from another device according to another example.
Figure 6:
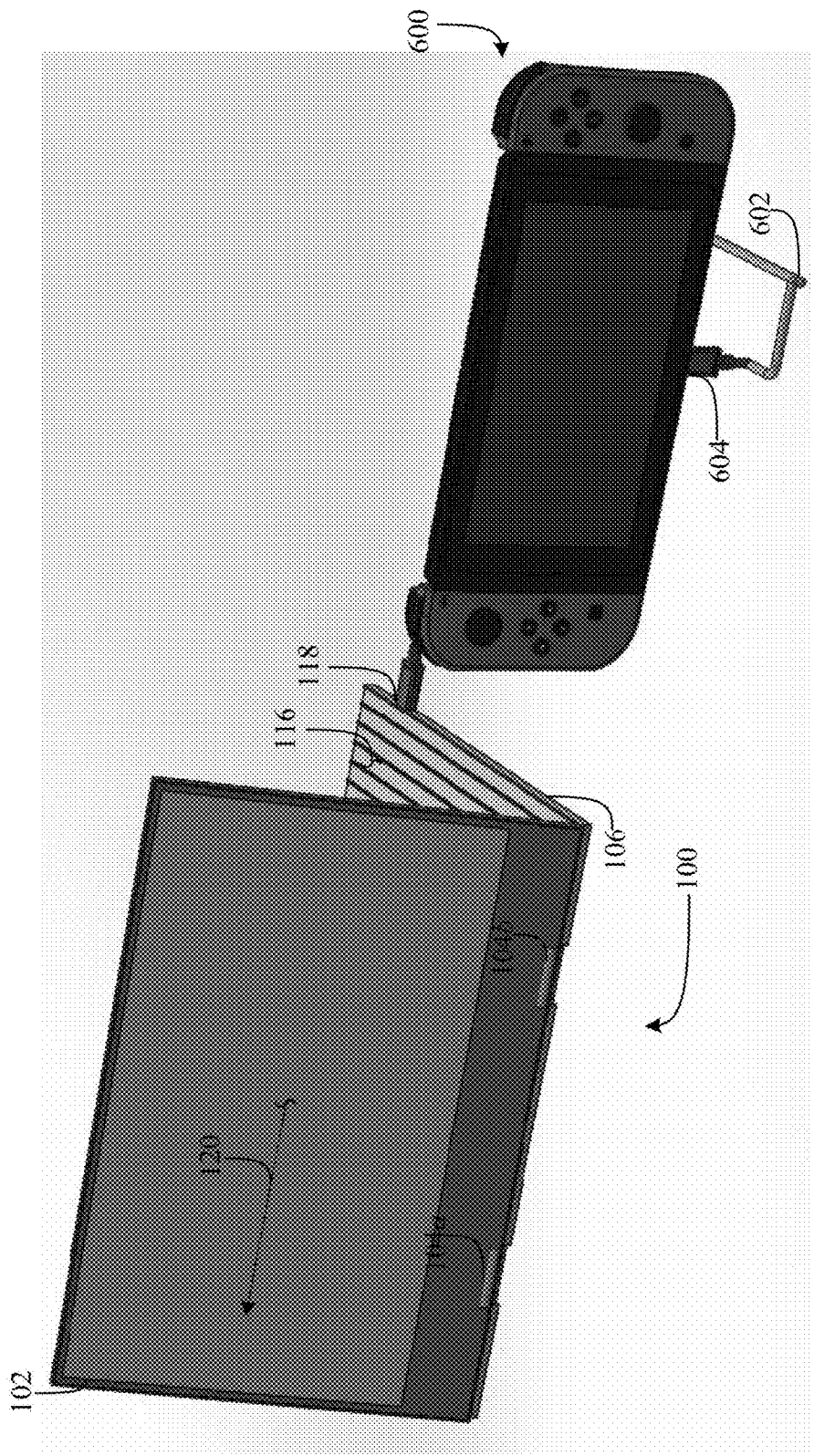
FIG. 6 illustrates a perspective view of the auxiliary display system being physically decoupled from another device according to another example.

FIG. 5 illustrates a perspective view of the auxiliary display system 100 being physically decoupled from another device, in this case a mobile communication device 500, according to another example. The auxiliary display system 100 is communicatively and electrically connected to the mobile communication device 500 via a wired connection 502. For example, the wired connection 502 may be connected to the wired connection port 118 and to a corresponding wired connection port 504 of the mobile communication device 500 to enable communication between the auxiliary display system 100 and the mobile communication device 500. The auxiliary display system 100 is configured in a laptop orientation in which the back surface 116 of the mount 106 rests on a surface that the auxiliary display system 100 is placed upon. The mount 106 may be co-planar with the surface that the auxiliary display system 100 is placed upon, in a similar manner as the laptop computer 200. The display portion 102 may be re-oriented about the z-axis via the hinges 104 as desired by a user.

In some examples, the auxiliary display system 100 may operate substantially as an auxiliary display configured to display information provided by a connected device. In other examples, the auxiliary display system 100 may execute functionality similar to that of a laptop computer. For example, in the example provided with respect to FIG. 5, the mobile communication device 500 may execute an operating system that enables the auxiliary display system 100 to execute computer programs in a similar manner as a laptop computer. A user may provide inputs to the auxiliary display system 100 via the input portions 112, 114 in a similar manner as the keyboard and touch-sensitive pad implemented in the laptop computer 200, and via the display portion 102 in examples in which the display portion 102 includes a touch-sensitive display. In some examples, the mobile communication device 500 may include a touch-sensitive screen that may be used in lieu of, or in addition to, the second input portion 114 to provide touch inputs to the auxiliary display system 100. Information (for example, user input information, display information, and so forth) may be exchanged between the auxiliary display system 100 and the mobile communication device 500 via the wired connection 502.

FIG. 6 illustrates a perspective view of the auxiliary display system 100 being physically decoupled from another device, in this case a gaming console 600, according to another example. The auxiliary display system 100 is connected to the gaming console 600 via a wired connection 602. For example, the wired connection 602 may be connected to the wired connection port 118 and to a corresponding wired connection port 604 of the gaming console 600 to enable communication between the auxiliary display system 100 and the gaming console 600. The auxiliary display system 100 is configured in a cantilevered orientation in which the front surface 110 of the mount 106 rests on a surface that the auxiliary display system 100 is placed upon. The mount 106 may be co-planar with the surface that the auxiliary display system 100 is placed upon. The display portion 102 may be re-oriented about the z-axis via the hinges 104 as desired by a user. In operation, the auxiliary display system 100 may provide a second, auxiliary display configured to display information provided by the gaming console 600 via the wired connection 602. The auxiliary display system 100 may be further configured to receive user inputs from a user where, for example, the display portion 102 is implemented including a touch-sensitive display configured to receive user touch inputs. Information (for example, user input information, display information, and so forth) may be exchanged between the auxiliary display system 100 and the gaming console 600 via the wired connection 602.

FIGS. 4-6 illustrate the auxiliary display system 100 in various configurations coupled to various devices. In other examples, the auxiliary display system 100 may be implemented in any configuration coupled to any device. For example, although FIG. 4 illustrates the auxiliary display system 100 in a standing orientation coupled to the laptop computer 200, in other examples, the auxiliary display system 100 may be in the standing orientation and may be coupled to the mobile communication device 500, the gaming console 600, or another device. Similarly, although FIG. 5 illustrates the auxiliary display system 100 in a laptop orientation coupled to the mobile communication device 500, in other examples, the auxiliary display system 100 may be in the laptop orientation and may be coupled to the laptop computer 200, the gaming console 600, or another device. Similarly, although FIG. 6 illustrates the auxiliary display system 100 in a cantilevered orientation coupled to the gaming console 600, in other examples, the auxiliary display system 100 may be in the cantilevered orientation and may be coupled to the laptop computer 200, the mobile communication device 500, or another device.

Alternate implementations of the foregoing principles are within the scope of the disclosure. For example, although in some examples an auxiliary display device may be rotatable about one axis (for example, along an axis that is parallel to an axis-of-rotation of a laptop computer), in other examples an auxiliary display device may be rotatable about several different axes, each of which may be substantially parallel to one another and an axis-of-rotation of a laptop computer in some examples.

Figure 7A:
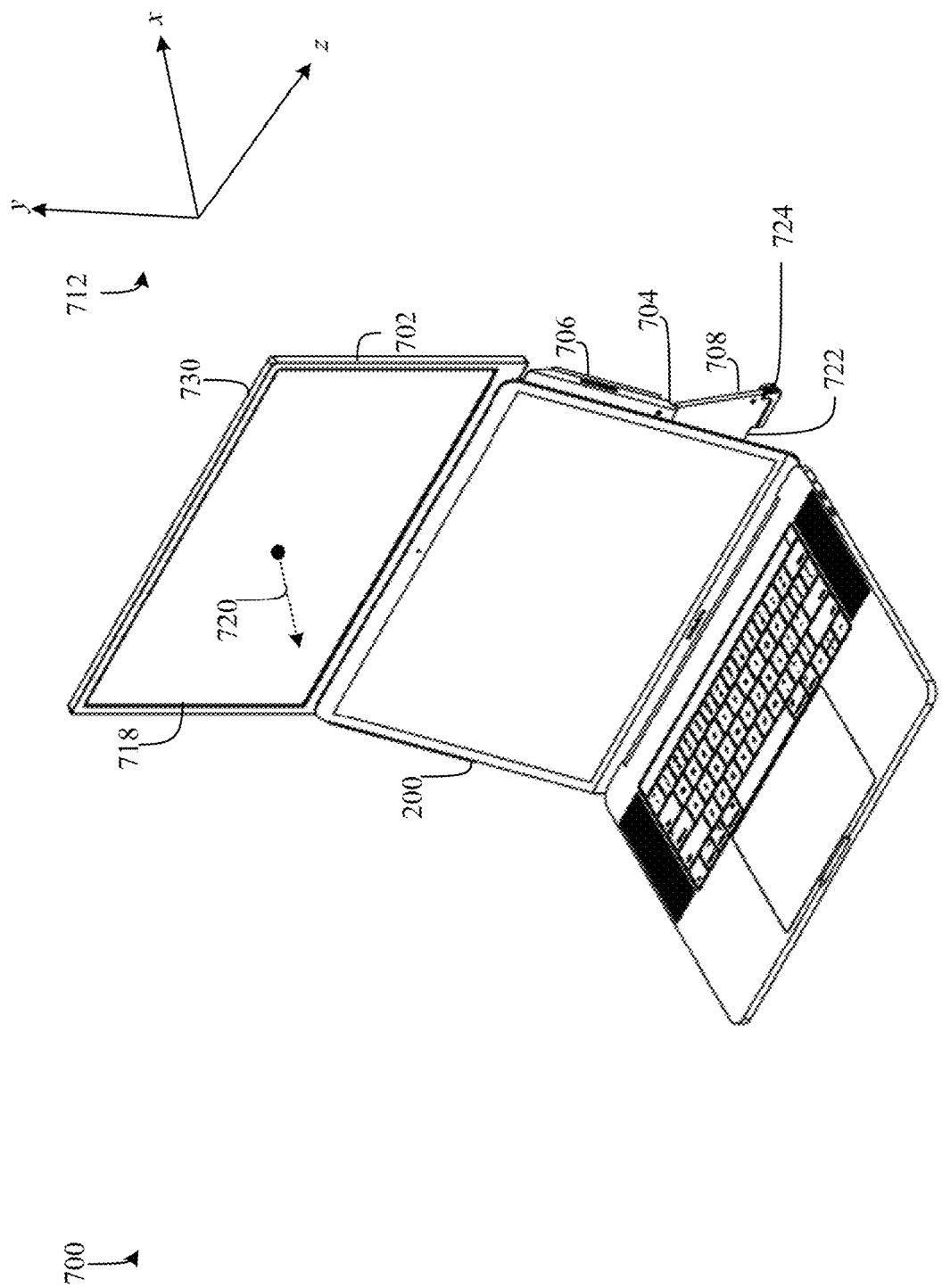
FIG. 7A is a front-perspective view of an auxiliary display system in an open orientation coupled to a laptop computer according to an example.
Figure 7B:
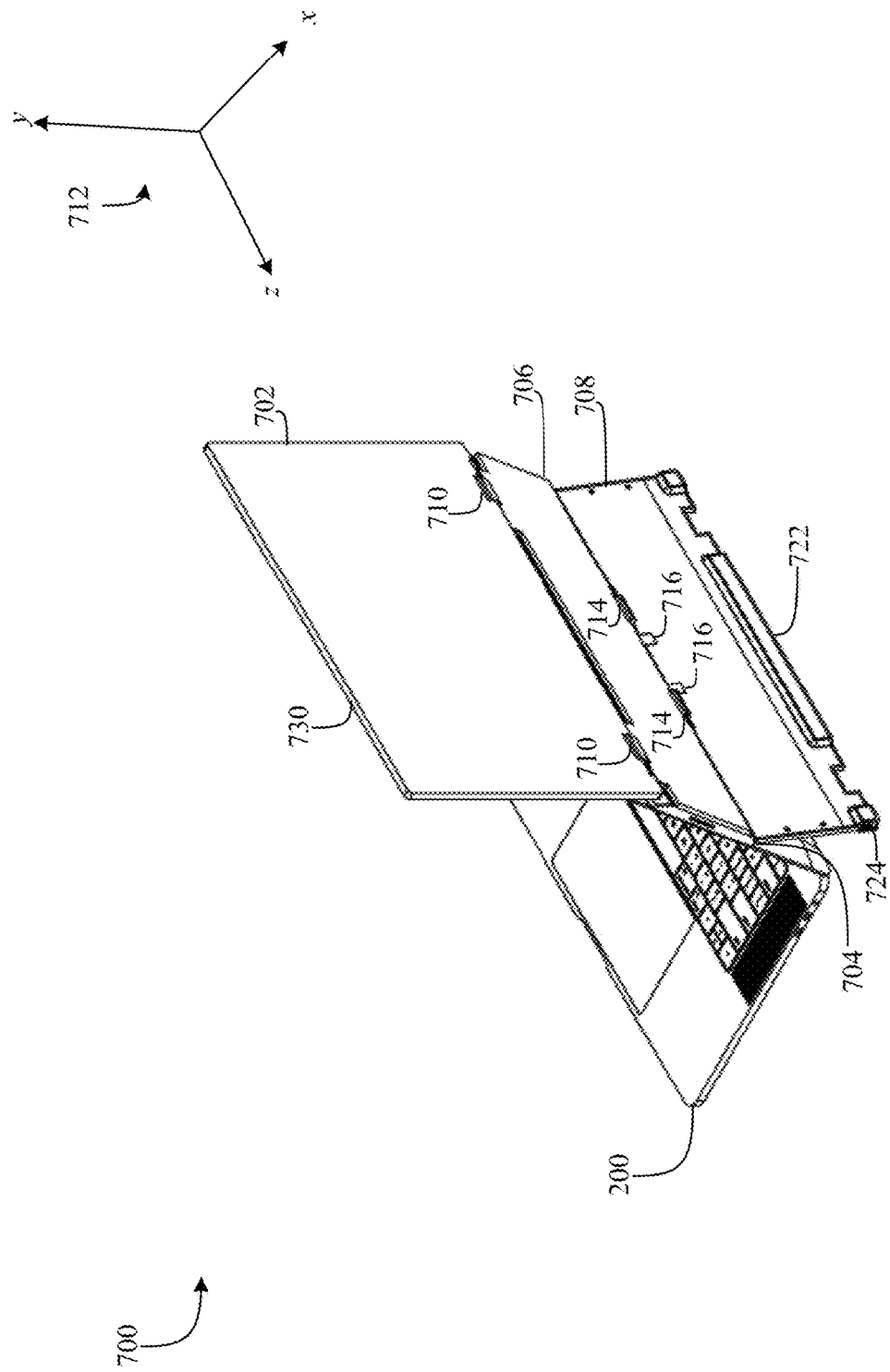
FIG. 7B is a back-perspective view of an auxiliary display system in an open orientation coupled to a laptop computer according to the example of FIG. 7A.
Figure 7C:
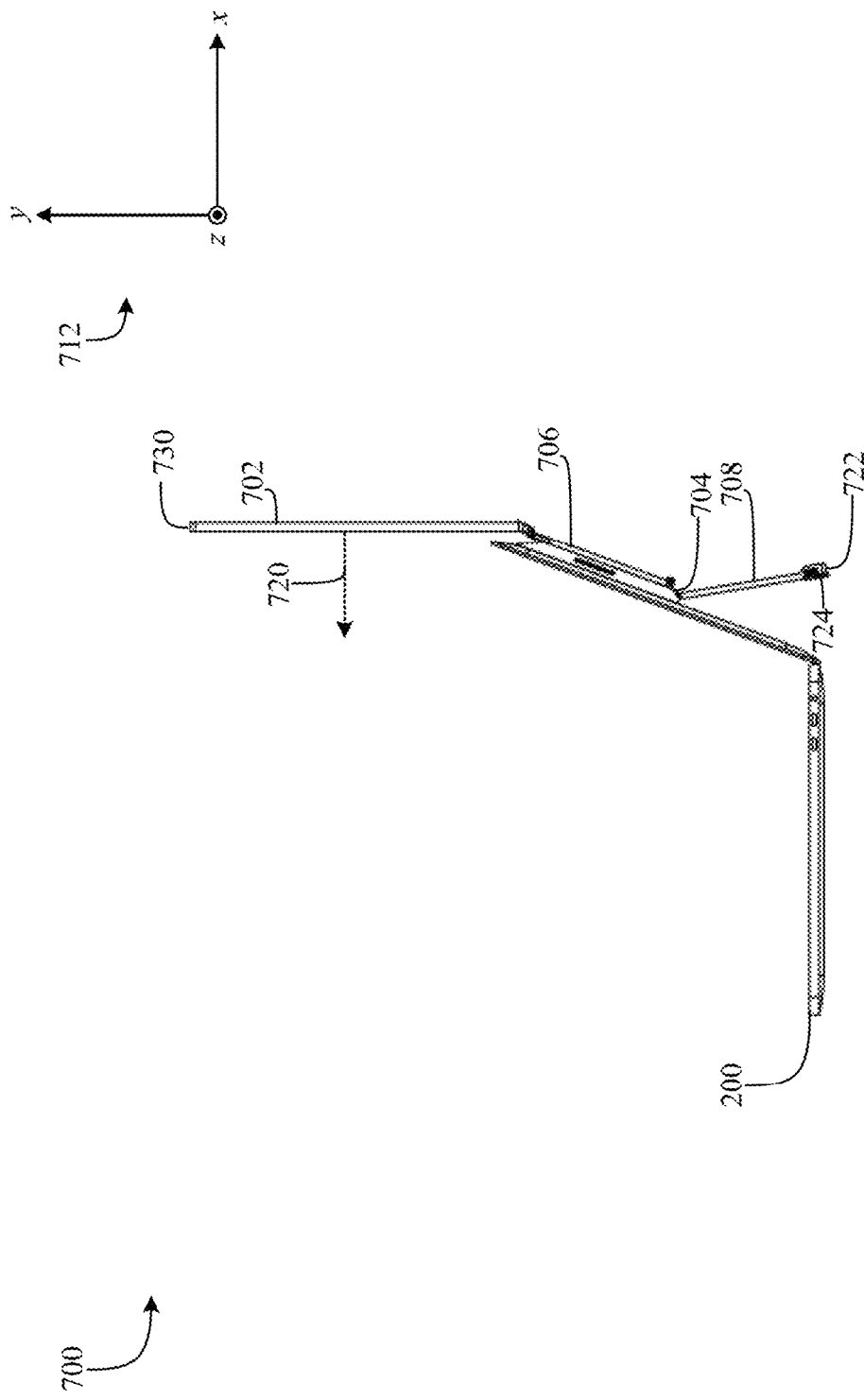
FIG. 7C is a right-side view of an auxiliary display system in an open orientation coupled to a laptop computer according to the example of FIG. 7A.
Figure 7D:
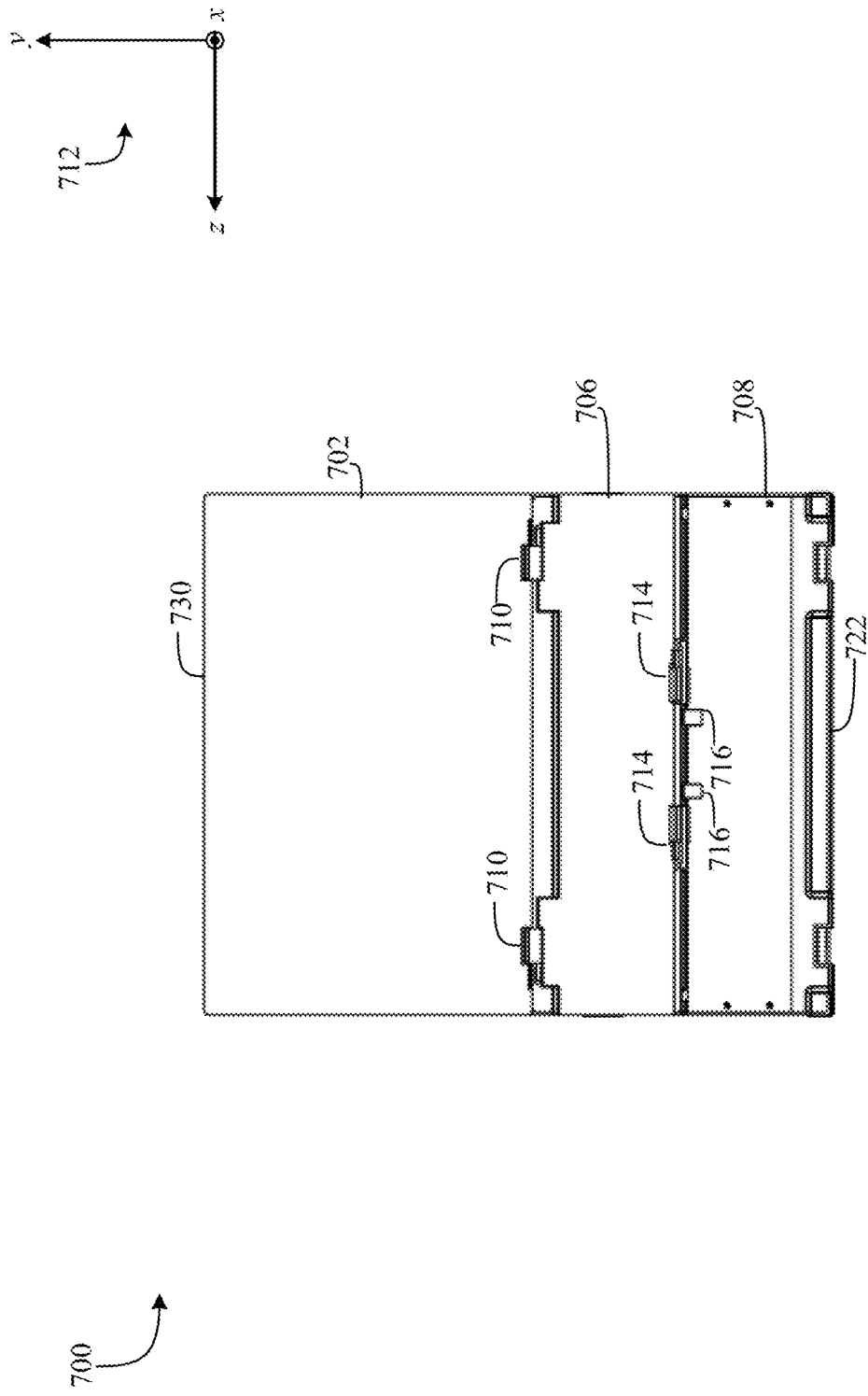
FIG. 7D is a back view of an auxiliary display system in an open orientation coupled to a laptop computer according to the example of FIG. 7A.

FIG. 7A illustrates a front-perspective view of an auxiliary display system 700 in an open orientation coupled to the laptop computer 200 according to an example. FIG. 7B illustrates a back-perspective view of the auxiliary display system 700 in the open orientation coupled to the laptop computer 200 according to an example. FIG. 7C illustrates a right-side view of the auxiliary display system 700 in the open orientation coupled to the laptop computer 200 according to an example. FIG. 7D illustrates a back view of the auxiliary display system 700 in the open orientation coupled to the laptop computer 200 according to an example.

The auxiliary display system 700 includes a display portion 702, a mount 704, a linkage bar 706, and a support 708. The display portion 702 may be substantially similar to the display portion 102, and is rotatably coupled to the linkage bar 706 via first hinges 710 about a z-axis indicated by a legend 712. The mount 704 is rotatably coupled to the linkage bar 706 via second hinges 714 about the z-axis. The mount 704 is rotatably coupled to the support 708 via third hinges 716 about the z-axis. In various examples, the laptop computer 200 is rotatable via the laptop hinges 212 about the z-axis such that each of the hinges 212, 710, 714, and 716 rotates about parallel axes. It is to be appreciated that in some examples, each of the hinges 212, 710, 714, and 716 may be considered to rotate about substantially parallel axes where the axes of rotation of the hinges 212, 710, 714, and 716 are not exactly parallel, such as due to slight variations between the hinges 212, 710, 714, and 716 (for example, variations induced by manufacturing differences, variations induced by a placement of the auxiliary display system 700 on the laptop computer 200, and so forth). Furthermore, although in some examples each of the hinges 710, 714, and 716 may include multiple hinges, in other examples, the hinges 710, 714, 716 may be implemented as a single hinge, and/or one or more other mechanical components enabling rotation about an axis.

In the open orientation, the display portion 702 may be angled towards a user of the laptop computer 200 such that the user may view information displayed by the display portion 702. The display portion 702 includes a display screen 718 configured to display information along an auxiliary display axis 720 normal to a plane in which the display screen 718 exists, similar to the manner by which the display screen 102 displays information along the auxiliary display axis 120. The support 708 includes a lower edge 722, which may physically contact a surface on which the auxiliary display system 700 is placed. The support 708 may provide physical support to the laptop computer 200 and auxiliary display system 700 by producing a moment that opposes a gravitational moment on the laptop computer 200 about the laptop hinges 212. The support 708 may be considered to be in a "deployed" state when the lower edge 722 is in contact with a physical entity, such as a surface, such that the support 708 exerts a force and/or moment on the laptop computer 200 that opposes a gravitational force and/or moment on the laptop computer 200.

The open orientation may include a range of rotation angles between the display portion 702 and linkage bar 706 about the first hinges 710. Similarly, the open orientation may include a range of rotation angles between the mount 704 and the support 708 about the third hinges 716. In various examples, the auxiliary display system 700 may be considered to be in the open orientation when the linkage bar 706 is rotated about the second hinges 714 to contact the mount 704, as illustrated in FIGS. 7A-7D, regardless of an orientation of the first hinges 710 and third hinges 716. For example, the auxiliary display system 700 may be considered to be in the open configuration whether or not the support 708 is deployed or not deployed.

A user of the laptop computer 200 and auxiliary display system 700 may therefore rotate the laptop computer 200, display portion 702, and support 708 to a desired angle based on the preferences of the user. In various examples, the hinges 710, 716 may be configured to maintain respective angles to which the user rotates the hinges 710, 716. For example, the hinges 710, 716 may include torque hinges configured to prevent rotation and maintain an angle at least in part by opposing a gravitational moment about the hinges 710, 716. Similarly, the second hinges 714 may also include torque hinges. Accordingly, the auxiliary display system 700 enables a user to view information displayed by the display portion 702 at various orientation angles desired by the user.

Figure 8A:
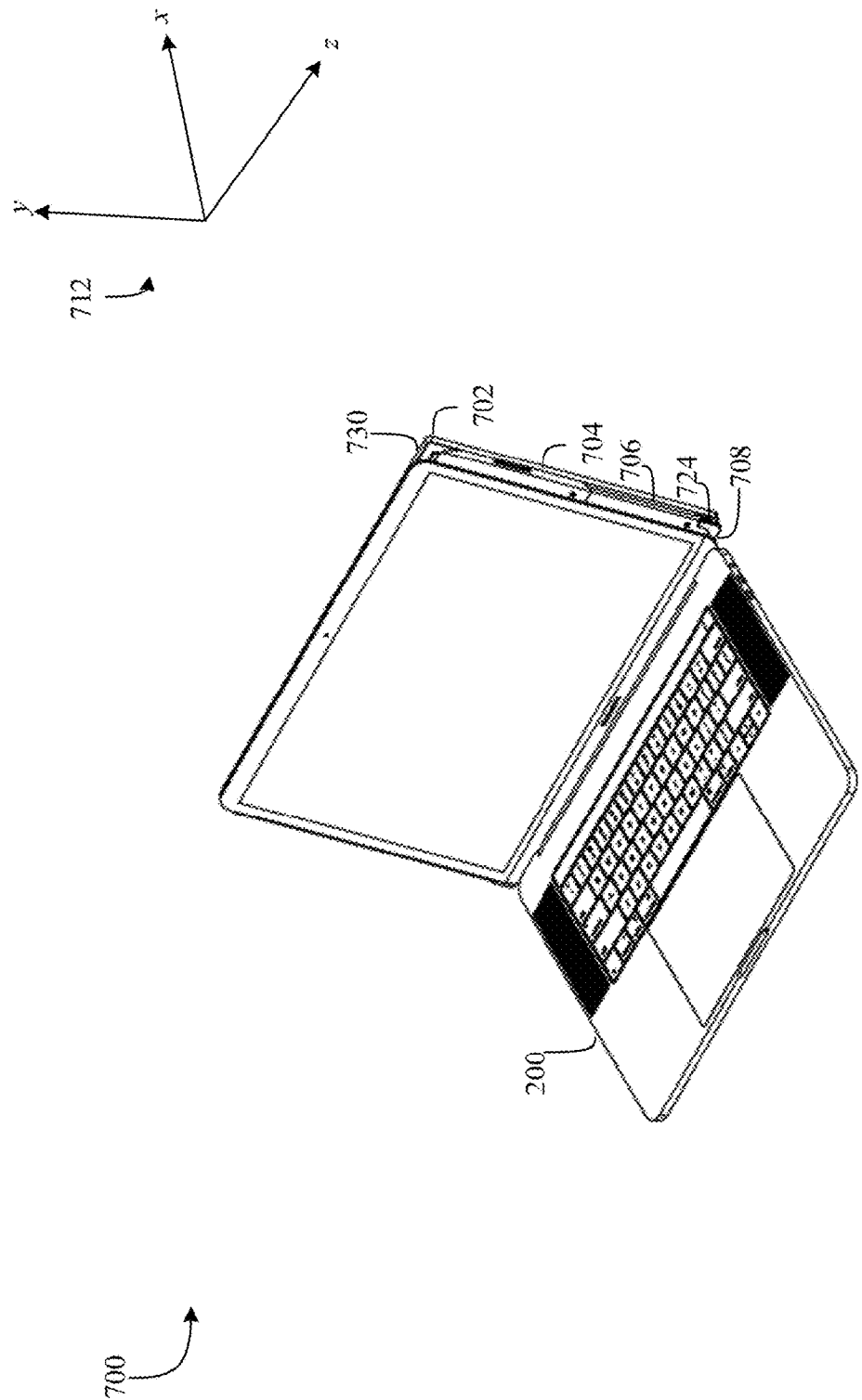
FIG. 8A illustrates a front-perspective view of an auxiliary display system in a closed orientation coupled to a laptop computer according to an example.
Figure 8B:
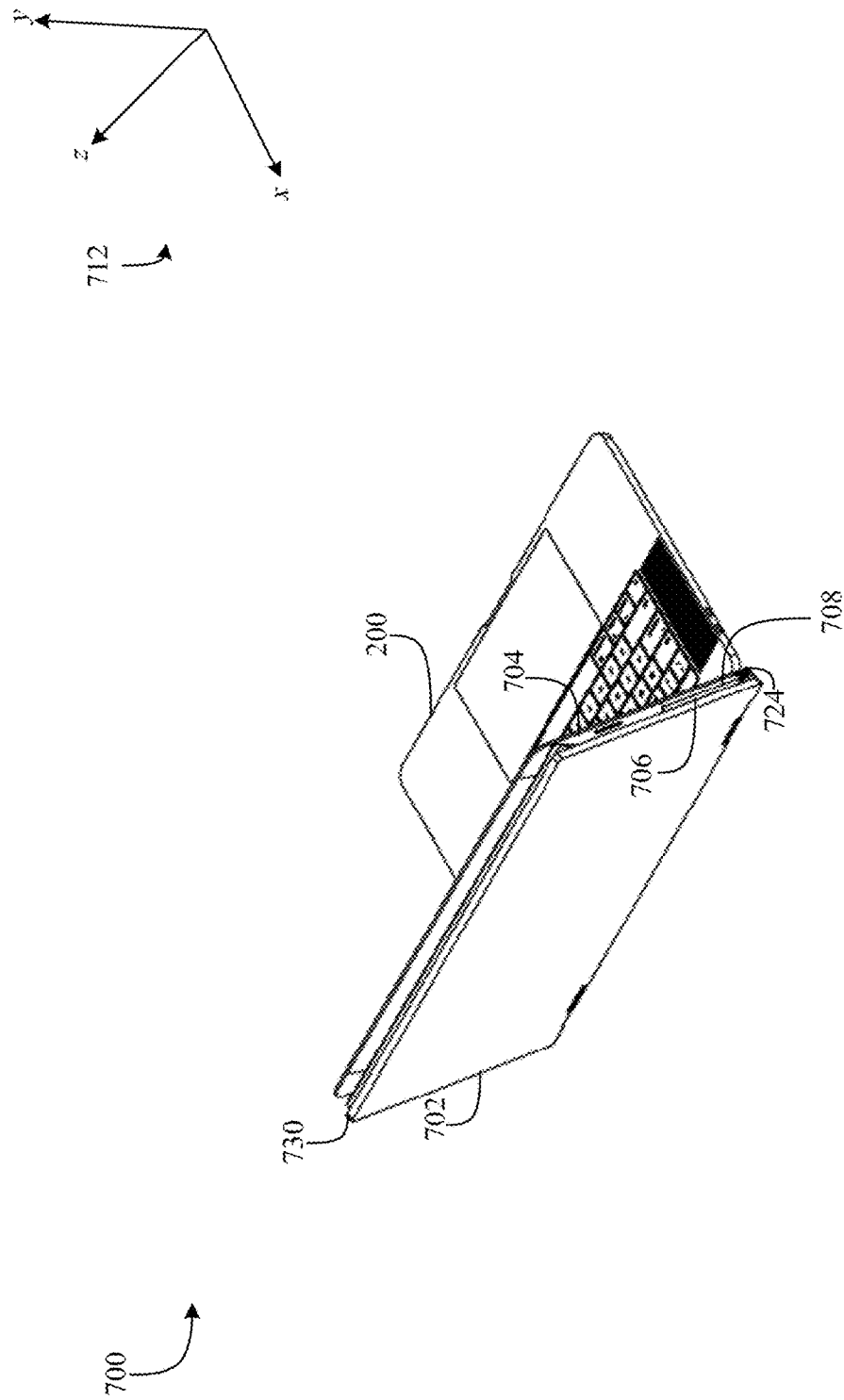
FIG. 8B illustrates a back-perspective view of an auxiliary display system in a closed orientation coupled to the laptop computer according to the example of FIG. 8A.
Figure 8C:
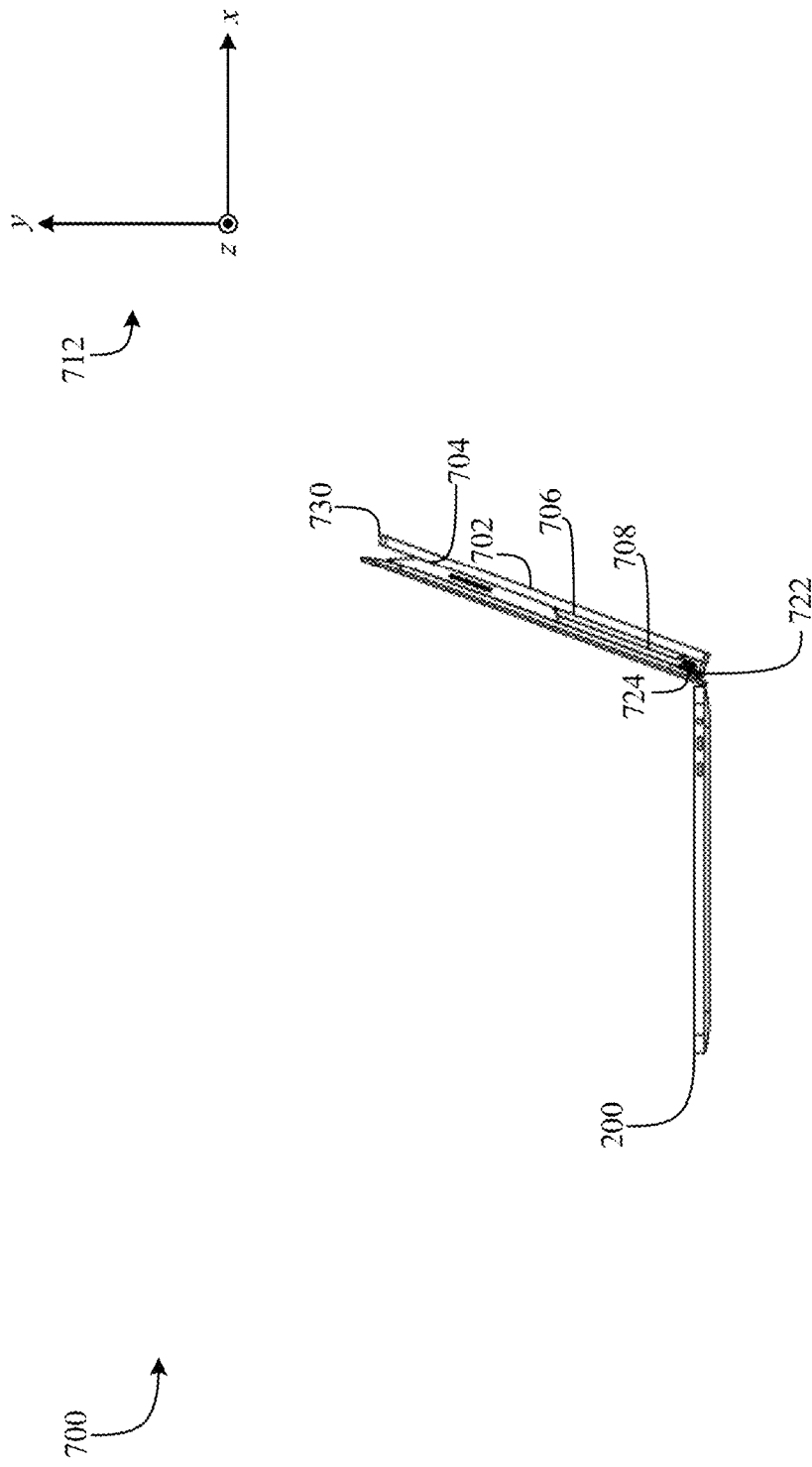
FIG. 8C illustrates a right-side view of an auxiliary display system in a closed orientation coupled to the laptop computer according to the example of FIG. 8A.
Figure 8D:
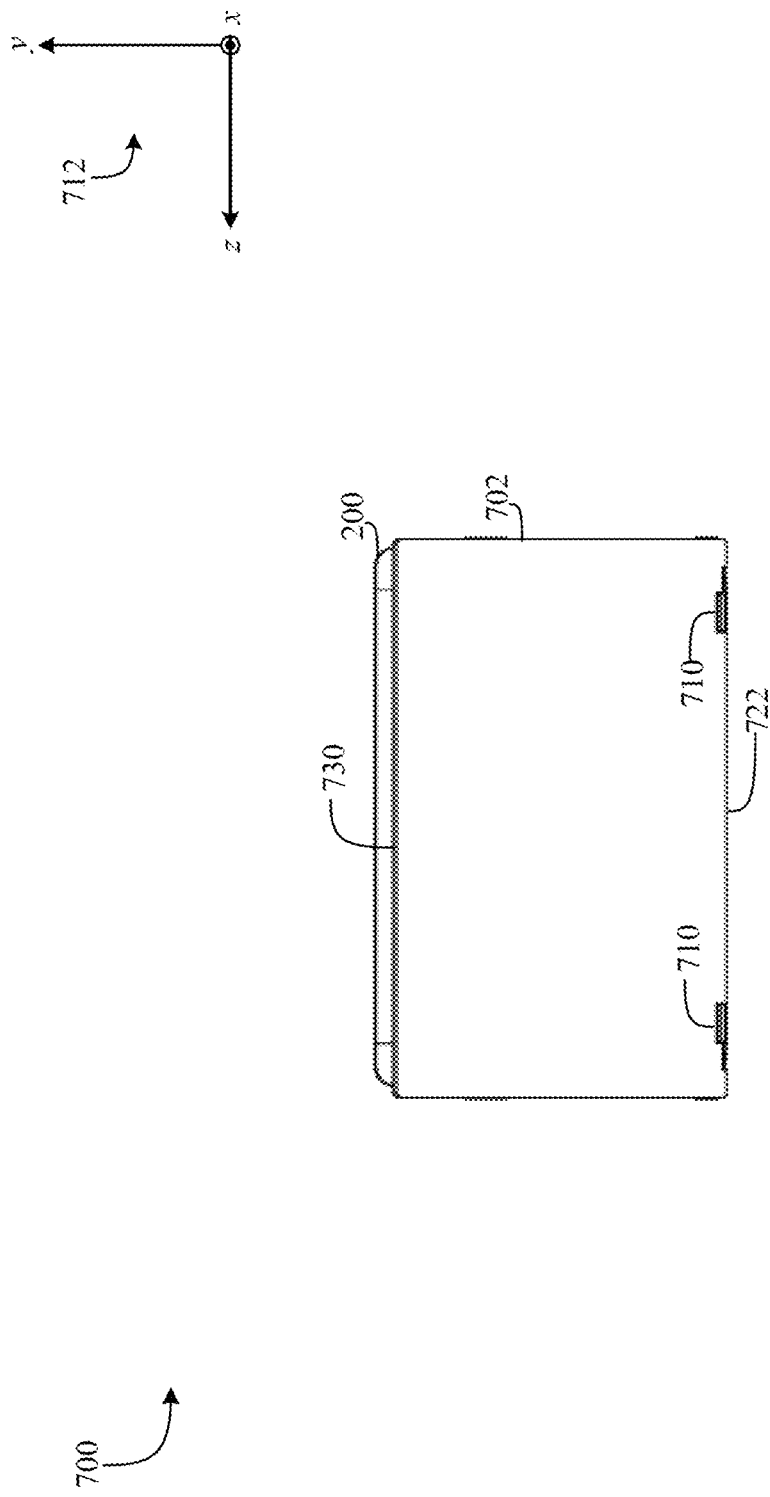
FIG. 8D illustrates a back view of an auxiliary display system in a closed orientation coupled to the laptop computer according to the example of FIG. 8A.

FIG. 8A illustrates a front-perspective view of an auxiliary display system 800 in a closed orientation coupled to the laptop computer 200 according to an example. FIG. 8B illustrates a back-perspective view of the auxiliary display system 800 in the closed orientation coupled to the laptop computer 200 according to an example. FIG. 8C illustrates a right-side view of the auxiliary display system 800 in the closed orientation coupled to the laptop computer 200 according to an example. FIG. 8D illustrates a back view of the auxiliary display system 800 in the closed orientation coupled to the laptop computer 200 according to an example.

In the closed orientation, the display portion 702 may be angled such that information displayed by the display portion 702 is not visible to a user, although information may not be displayed by the display portion 702 in the closed orientation. For example, the user may place the auxiliary display system 700 in the closed orientation when the user is not using the auxiliary display system 700 to view information. The closed orientation may include rotation angles of the hinges 710, 714, 716 in which the linkage bar 706 contacts the support 708, and in which the display portion 702 contacts the linkage bar 706 and the mount 704, such that the linkage bar 706 is between the support 708 and the display portion 702. Accordingly, one difference between the closed orientation and the open orientation may include the linkage bar 706 contacting the mount 704 in the open orientation, and contacting the display portion 702 and the support 708 in the closed configuration.

To place the auxiliary display system 700 in the closed orientation illustrated in FIGS. 8A-8D from the open orientation illustrated in FIGS. 7A-7D, the support 708 may be rotated clockwise about the z-axis (that is, in a negative direction about the z-axis) via the third hinges 716 until the support 708 contacts the laptop computer 200 such that the support 708 is parallel to the mount 704. The linkage bar 706 may be rotated clockwise about the z-axis (that is, in a negative direction about the z-axis) via the second hinges 714 until the linkage bar 706 contacts the support 708 such that the linkage bar 706 is parallel to the support 708 (for example, by rotating approximately 180° clockwise about the z-axis to transition from the open orientation to the closed orientation). The display portion 702 may be rotated counterclockwise about the z-axis (that is, in a positive direction about the z-axis) via the first hinges 710 until the display portion 702 contacts the mount 704 and the linkage bar 706.

Figure 9A:
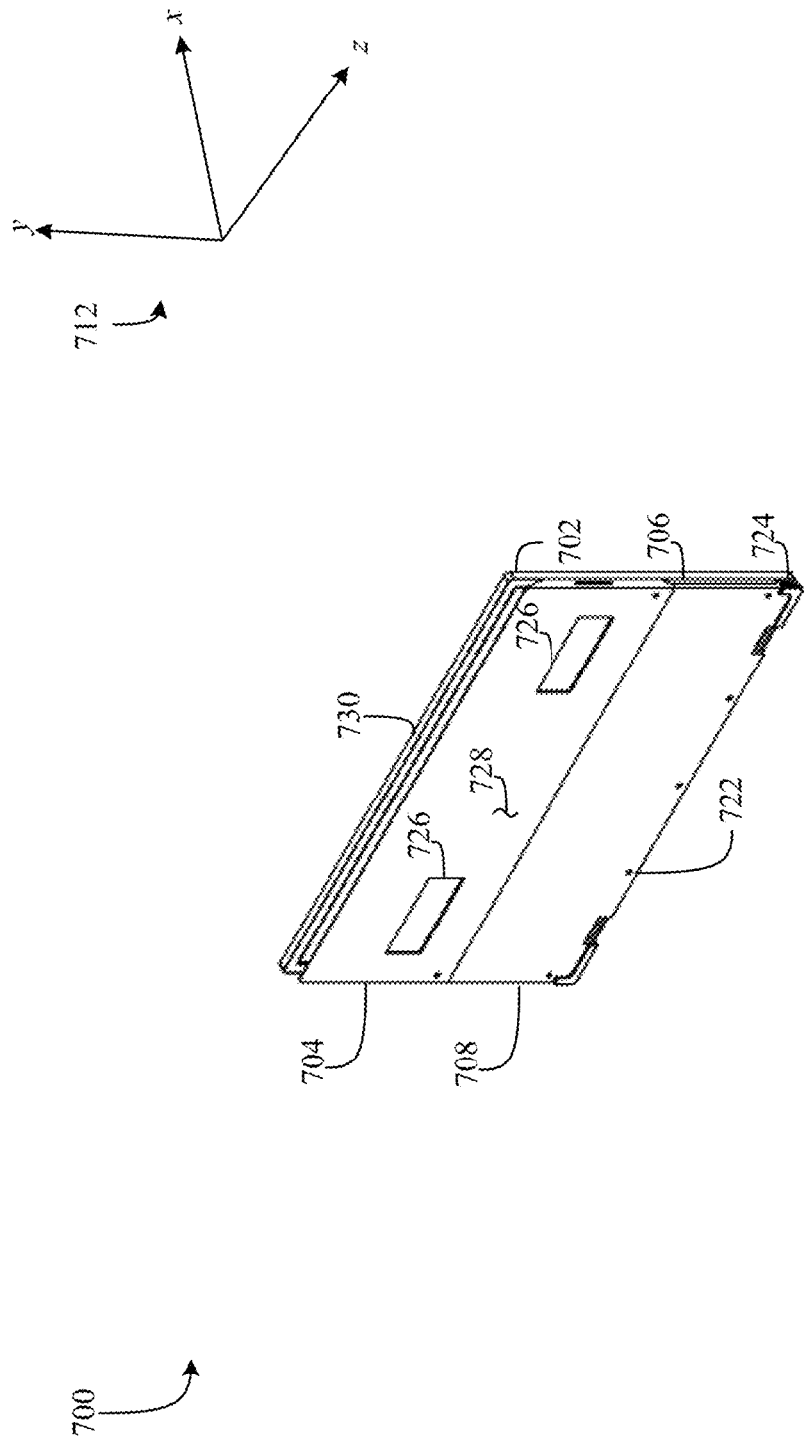
FIG. 9A illustrates a front-perspective view of an auxiliary display system in a closed orientation according to another example.
Figure 9B:
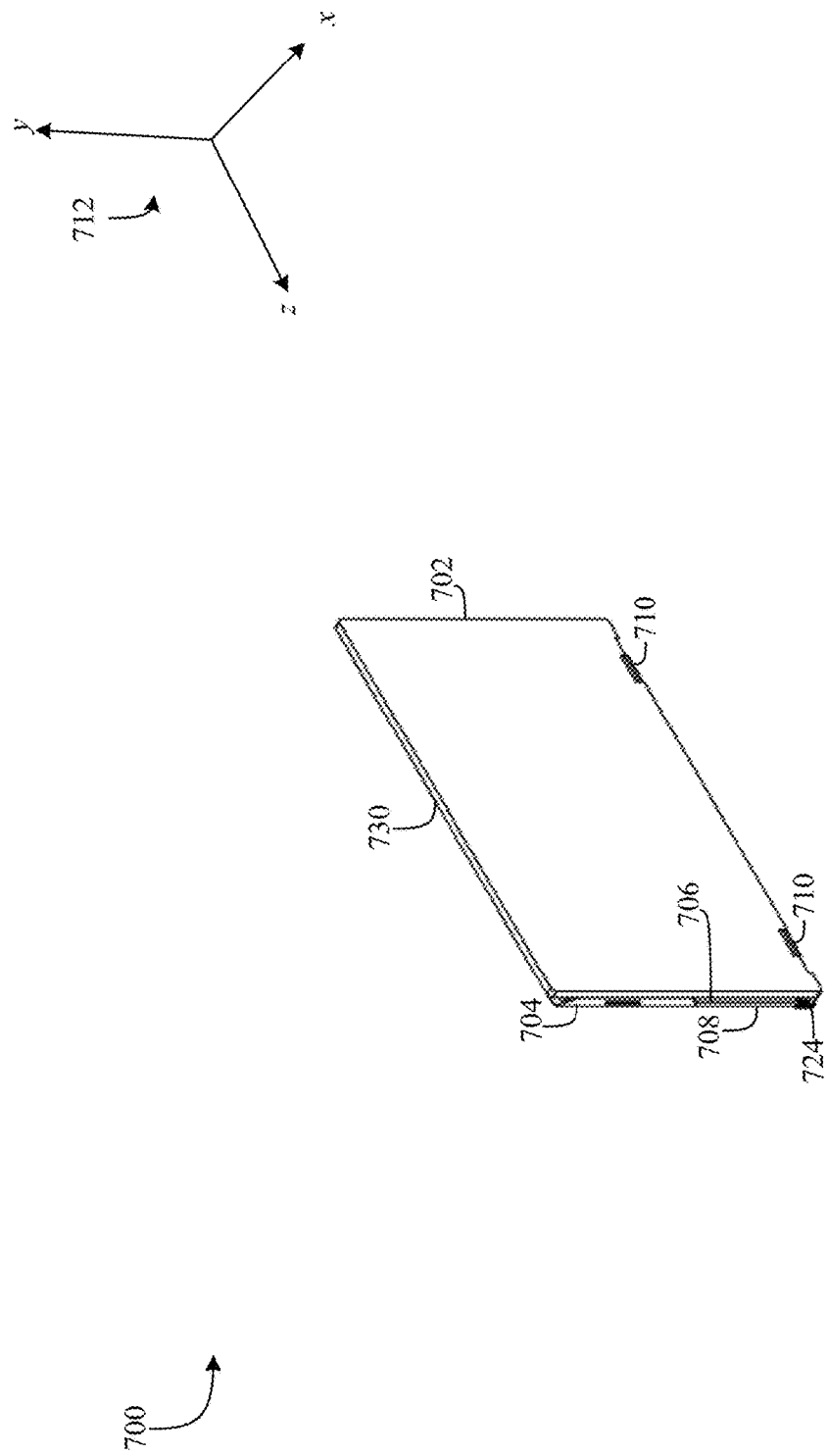
FIG. 9B illustrates a back-perspective view of an auxiliary display system in a closed orientation according to the example of FIG. 9A.
Figure 9C:
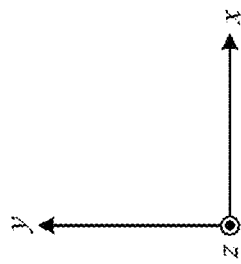
FIG. 9C illustrates a right-side view of an auxiliary display system in a closed orientation coupled to a laptop computer according to the example of FIG. 9A.
Figure 9C:
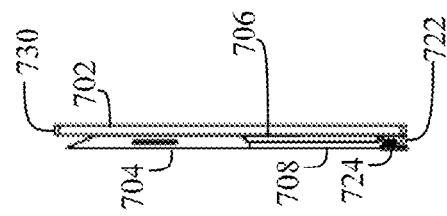
Figure 9D:
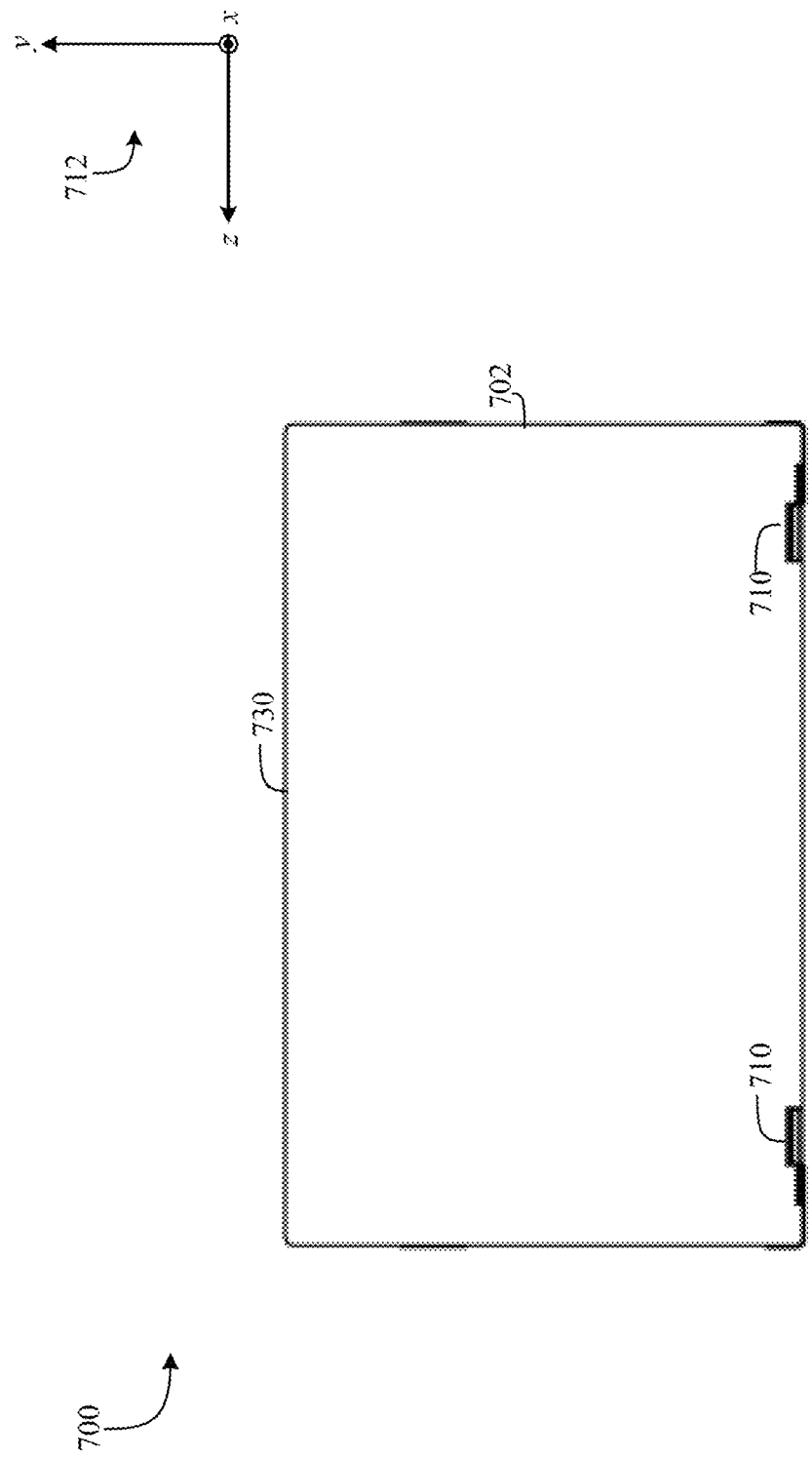
FIG. 9D illustrates a back view of an auxiliary display system in a closed orientation coupled to a laptop computer according to the example of FIG. 9A.

FIG. 9A illustrates a front-perspective view of the auxiliary display system 700 in another closed orientation and decoupled from the laptop computer 200 according to an example. FIG. 9B illustrates a back-perspective view of the auxiliary display system 700 in the closed orientation of FIG. 9A according to an example. FIG. 9C illustrates a right-side view of the auxiliary display system 700 in the closed orientation of FIG. 9A according to an example. FIG. 9D illustrates a back view of the auxiliary display system 800 in the closed orientation of FIG. 9A according to an example.

The support 708 includes a wired connection port 724, which may be substantially similar to the wired connection port 118. For example, the wired connection port 724 may enable a wired connection to be established between the auxiliary display system 700 and other computing device such as the laptop computer 200, such that electrical power and information may be transmitted or exchanged between the laptop computer 200 and auxiliary display system 700. In various examples, the wired connection port 724 may include several wired connection ports. For example, the auxiliary display system 700 may include two wired connection ports, each symmetrically positioned on either side of the support 708.

The support 708 may further include one or more processing components or devices inside of the support 708 (not illustrated). For example, the support 708 may include a printed circuit board (PCB) having one or more electrical components configured to facilitate operation of the auxiliary display system 700, such as by receiving information from the laptop computer 200 via the wired connection port 724 and controlling the display screen 718 to display the received information. In this example, the PCB may be electrically coupled to the wired connection port 724 such that power and/or information received at the wired connection port 724 is provided to the PCB.

The mount 704 includes coupling elements 726 disposed in a back surface 728 of the mount 704. The coupling elements 726 may be substantially similar to the coupling elements 108. For example, the coupling elements 726 may enable the back surface 728 of the auxiliary display system 700 to be removably or fixedly physically coupled to the backplane 206 of the laptop computer 200. The coupling elements 726 may include magnets, adhesives, adhesive magnets, hook and/or loop in a hook-and-loop arrangement, snaps, interference-fit fasteners, grooves configured to mate with rails or vice versa, protrusions configured to mate with openings or vice versa, or any other elements capable of providing a fixed or removable physical coupling between the auxiliary display system 700 and the laptop computer 200. The laptop computer 200 may include a corresponding coupling element configured to couple to the coupling elements 726.

A number, position, and/or configuration of the coupling elements 726 may vary in different implementations. For example, while the coupling elements 726 may be at least partially external to the auxiliary display system 700 in some examples, in other examples, the coupling elements 726 may be entirely internal to the auxiliary display system 700. In one example, the coupling elements 726 may include magnets disposed entirely within the mount 704 such that the magnets are not visible outside the auxiliary display system 700.

In another example, the auxiliary display system 700 may include additional coupling elements configured to enable or facilitate coupling between components other than the laptop computer 200 and the auxiliary display system 700. For example, the mount 704 may include coupling elements (not illustrated), such as magnets, and the linkage bar 706 may include corresponding coupling elements (not illustrated), such as corresponding magnets to provide a magnetic connection with the coupling elements of the mount 704. In various examples, the coupling elements may be internal to the mount 704 and the linkage bar 706. The coupling elements in the mount 704 and/or linkage bar 706 may facilitate a physical connection between the mount 704 and the linkage bar 706 when the auxiliary display system 700 is in the open configuration. As discussed above, the mount 704 may physically contact the linkage bar 706 when the auxiliary display system 700 is in the open configuration. In an example in which the coupling elements in the mount 704 and/or linkage bar 706 include magnets in each of the mount 704 and linkage bar 706, a magnetic force between the corresponding magnets may facilitate the physical connection between the mount 704 and linkage bar 706, even if the example magnets are internal to the mount 704 and linkage bar 706 and thus do not physically contact each other. The magnetic force attracting the mount 704 to the linkage bar 706 may exert a positive moment about the z-axis along the second hinges 714 to at least partially counteract a negative gravitational moment about the z-axis along the second hinges 714. In various examples, a strength, number, and/or positioning of such magnets may be selected such that a user is able to overcome the magnetic force by pulling the linkage bar 706 away from the mount 704.

Figure 10A:
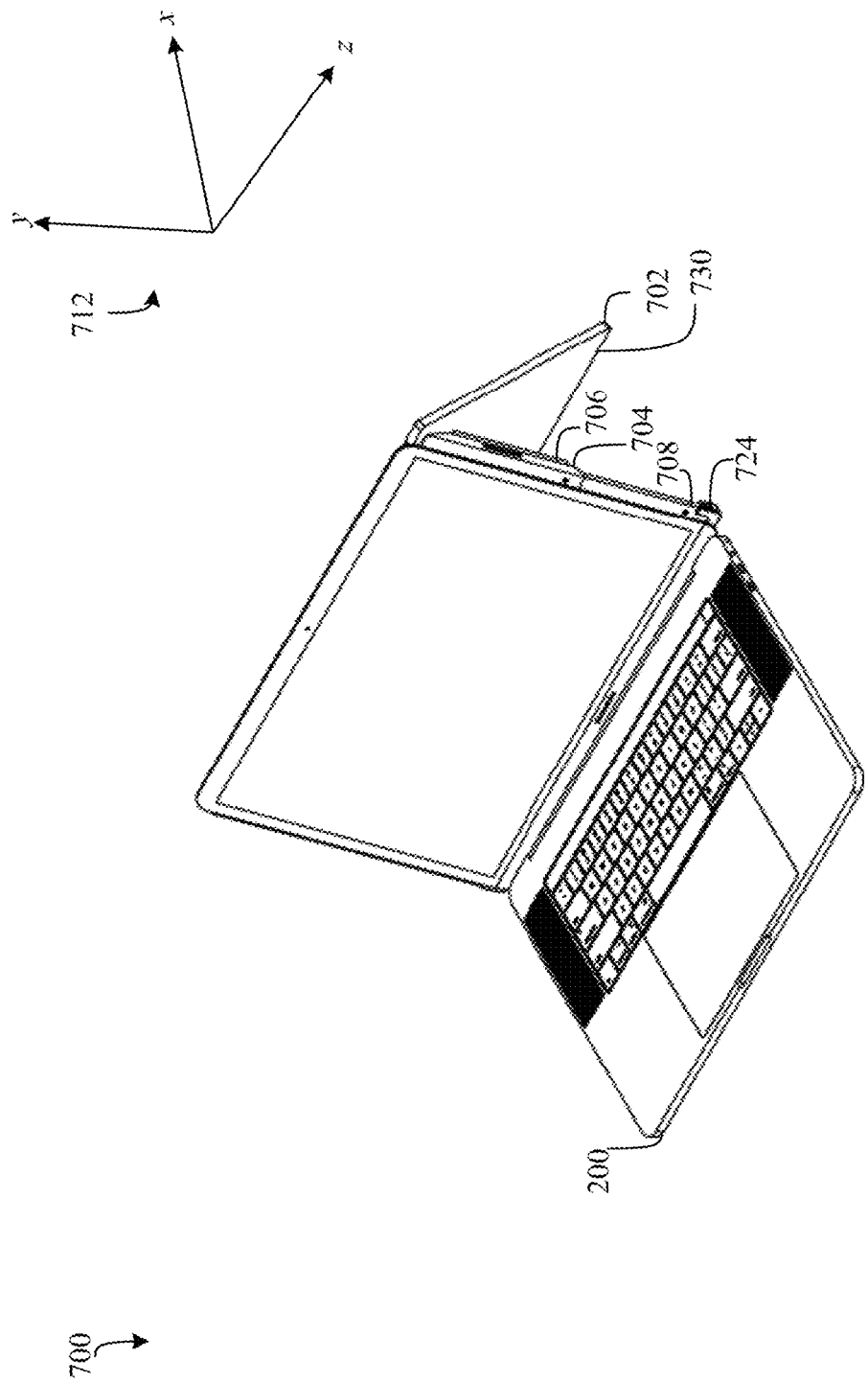
FIG. 10A illustrates a front-perspective view of an auxiliary display system in a display orientation according to an example.
Figure 10B:
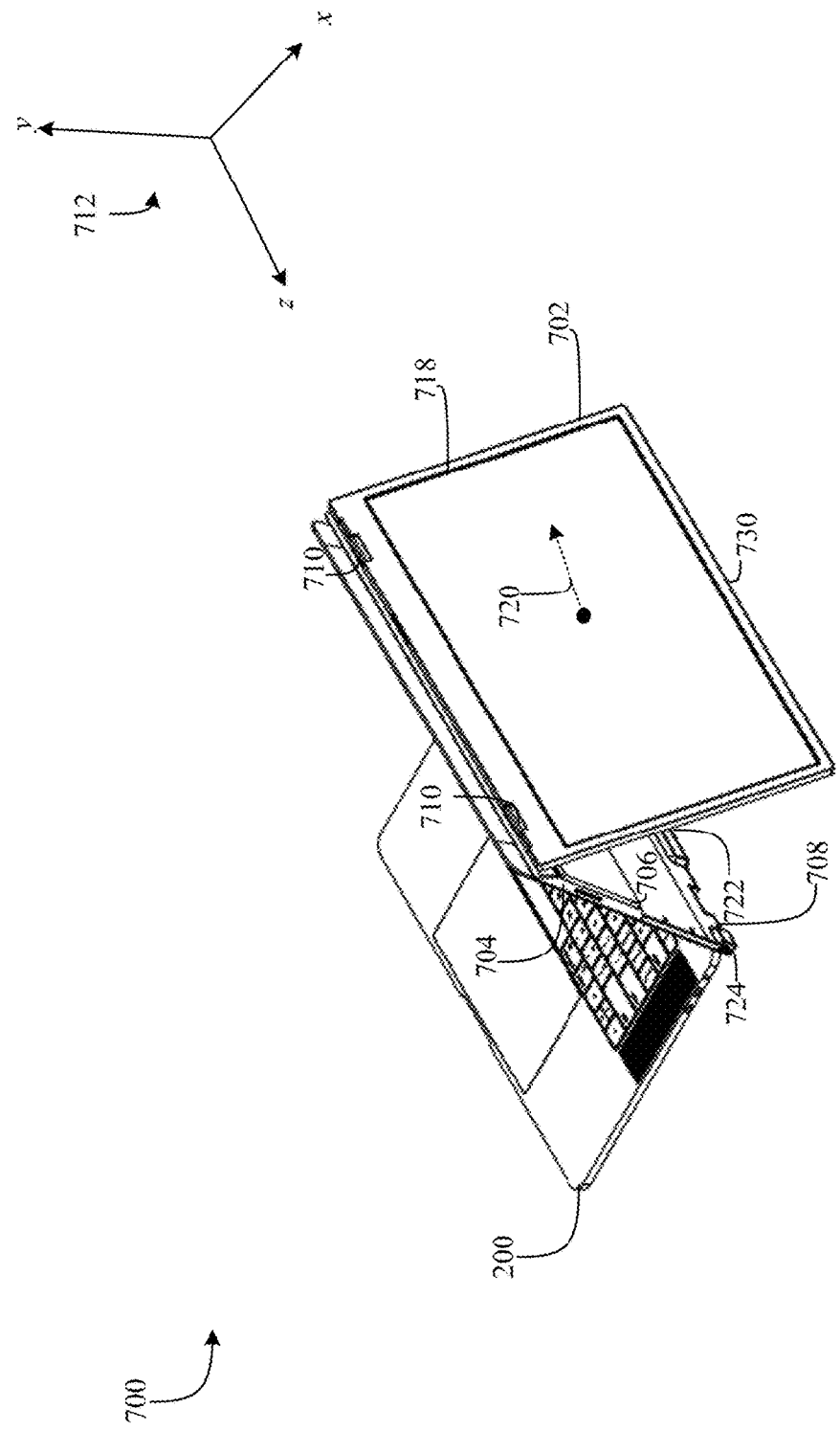
FIG. 10B illustrates a back-perspective view of the auxiliary display system in a display orientation according to the example of FIG. 10A.
Figure 10C:
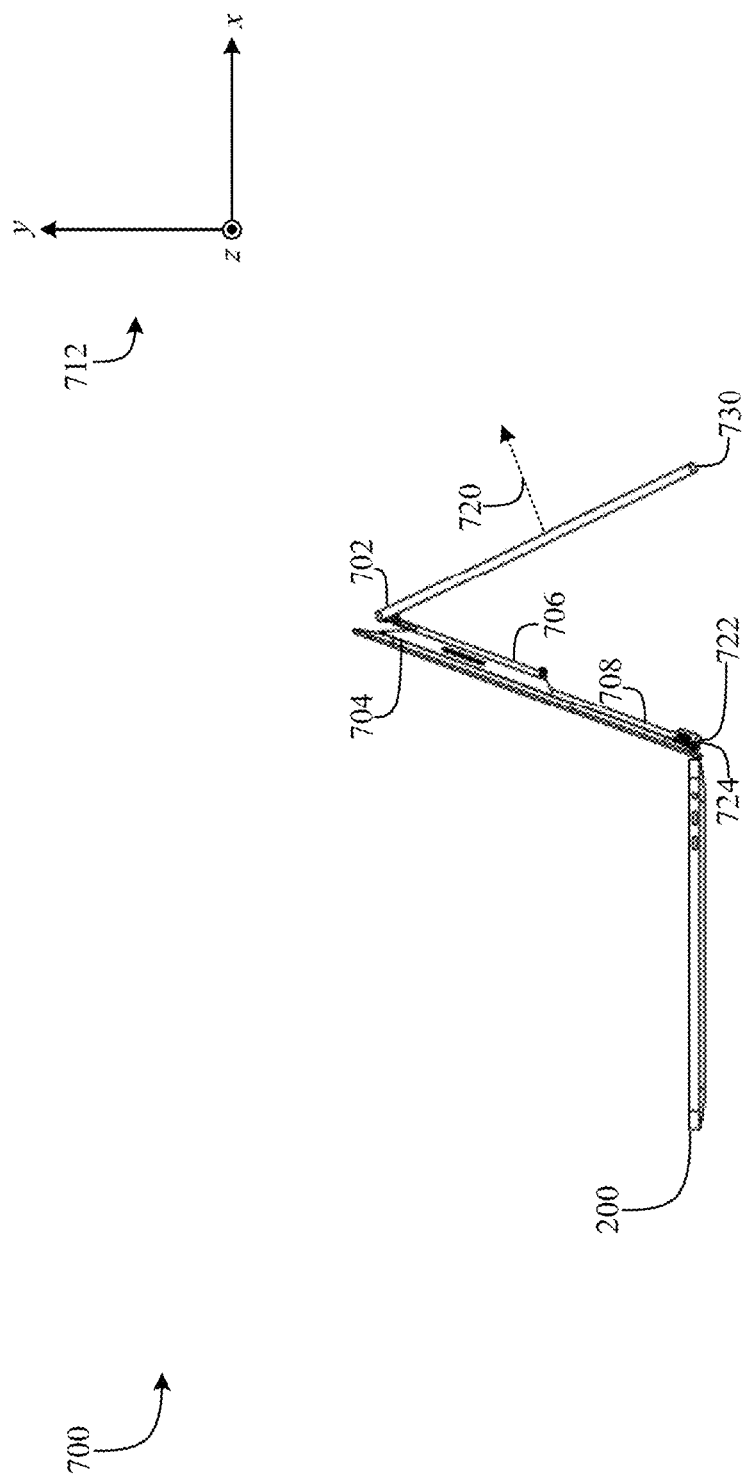
FIG. 10C illustrates a right-side view of the auxiliary display system in a display orientation according to the example of FIG. 10A.
Figure 10D:
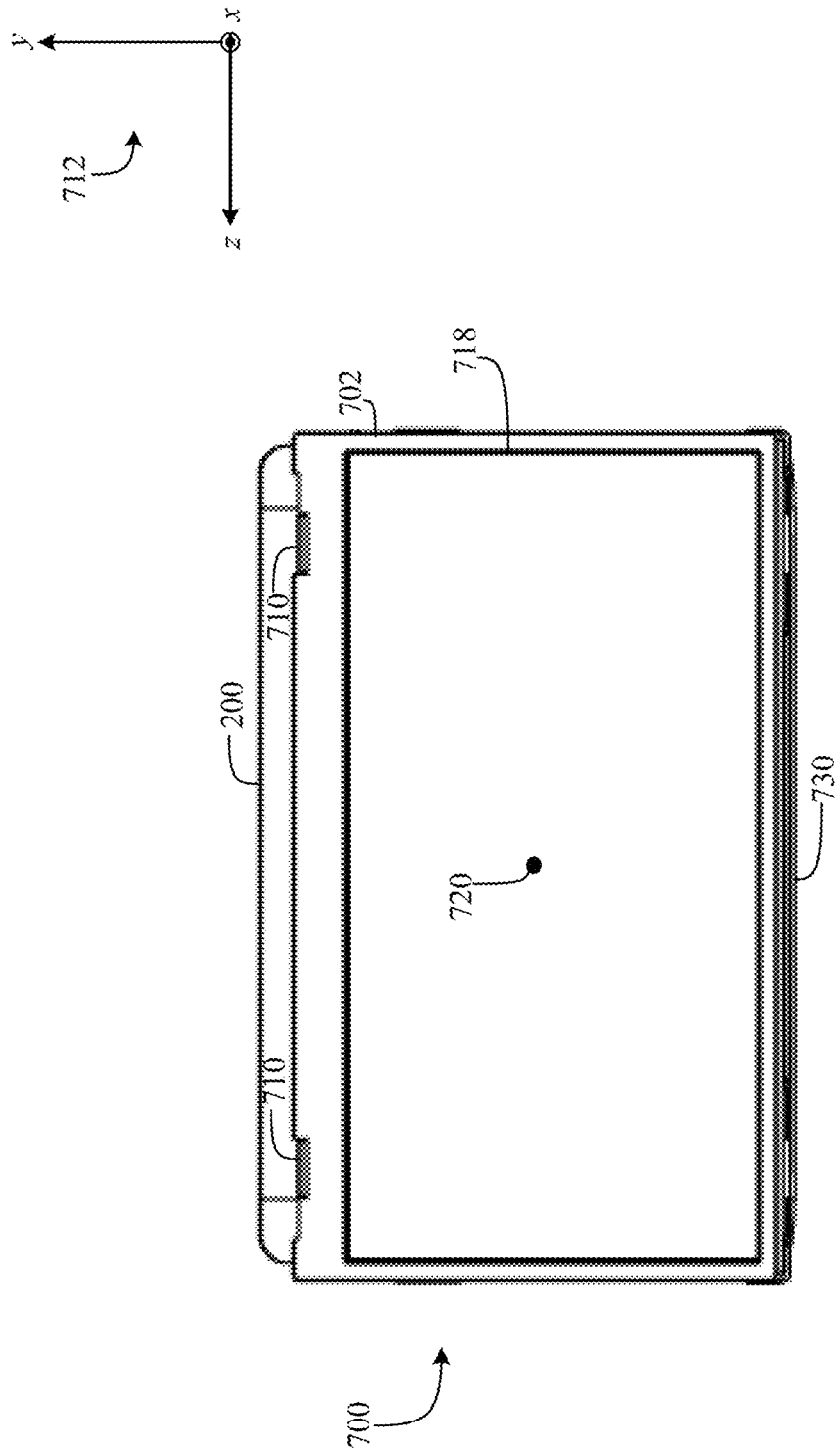
FIG. 10D illustrates a back view of the auxiliary display system in a display orientation according to the example of FIG. 10A.

The auxiliary display system 700 may also be deployed in a display orientation. FIG. 10A illustrates a front-perspective view of the auxiliary display system 700 in the display orientation according to an example. FIG. 10B illustrates a back-perspective view of the auxiliary display system 700 in the display orientation according to an example. FIG. 10C illustrates a right-side view of the auxiliary display system 700 in the display orientation according to an example. FIG. 10D illustrates a back view of the auxiliary display system 700 in the display orientation according to an example.

In the display orientation, the display portion 702 may be oriented away from a user of the laptop computer 200. For example, the auxiliary display axis 720 may point approximately opposite the user, such that an individual facing the user may view information displayed on the display screen 718. An upper edge 730 of the display portion 702 may contact a surface on which the laptop computer 200 is placed to provide physical support to the laptop computer 200 and auxiliary display system 700 by producing a moment that opposes a gravitational moment on the laptop computer 200 about the laptop hinges 212.

In some examples of the display orientation, the auxiliary display system 700 may be physically coupled to the laptop computer 200 via the coupling elements 726, as illustrated in FIGS. 10A-10D. In other examples, the auxiliary display system 700 may be physically decoupled from the laptop computer 200 while in the display orientation. The lower edge 722 of the support 708 and the upper edge 730 of the display portion 702 may contact a surface on which the auxiliary display system 700 is placed to maintain the auxiliary display system 700 in an upright position, similar to that illustrated in FIGS. 10A-10D. An angle between the display portion 702 and the mount 704 may be altered by rotating the display portion 702 and the mount 704 about the first hinges 710 to a desired orientation.

Figure 11A:
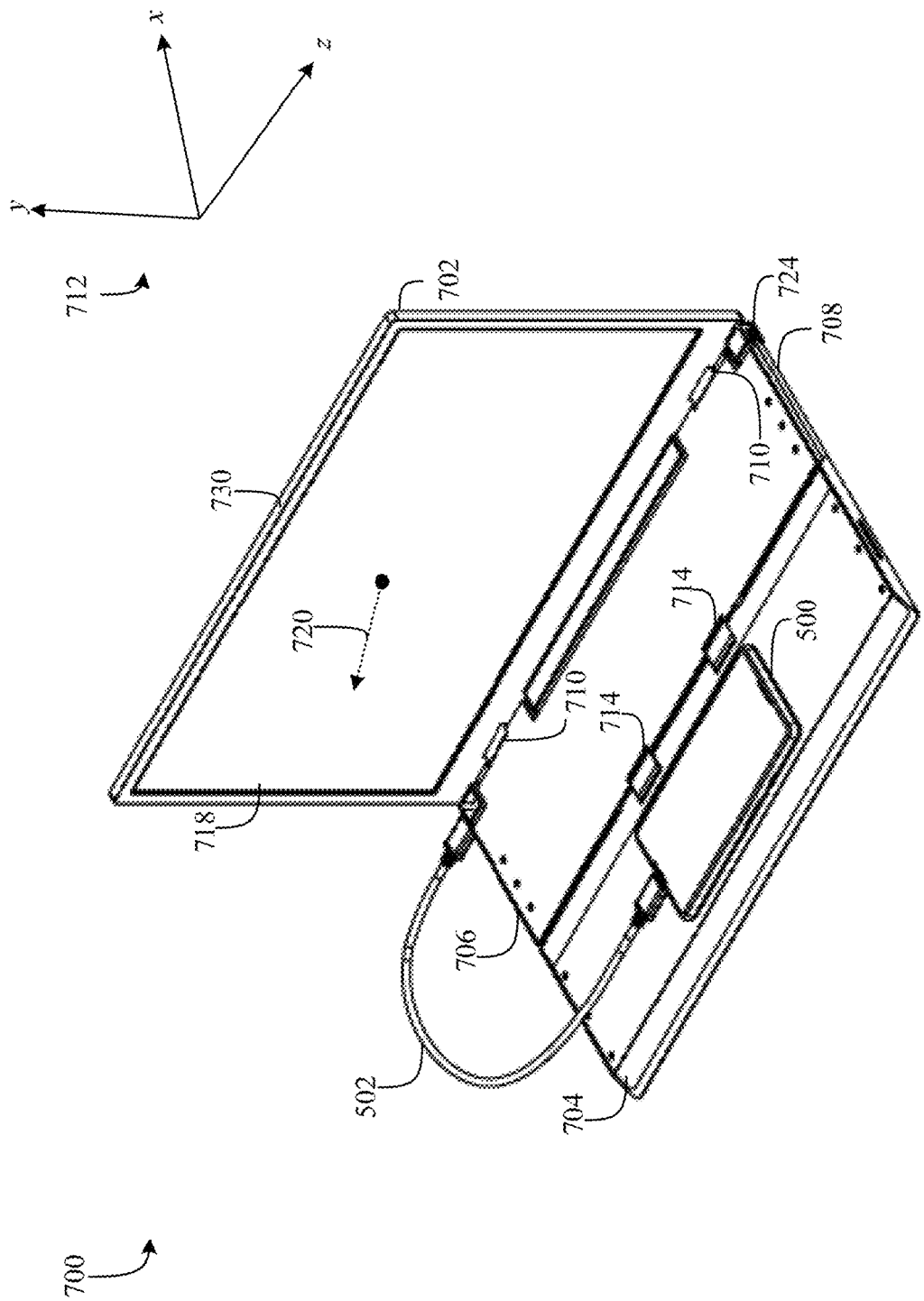
FIG. 11A illustrates a front-perspective view of an auxiliary display system in a laptop orientation according to an example.
Figure 11B:
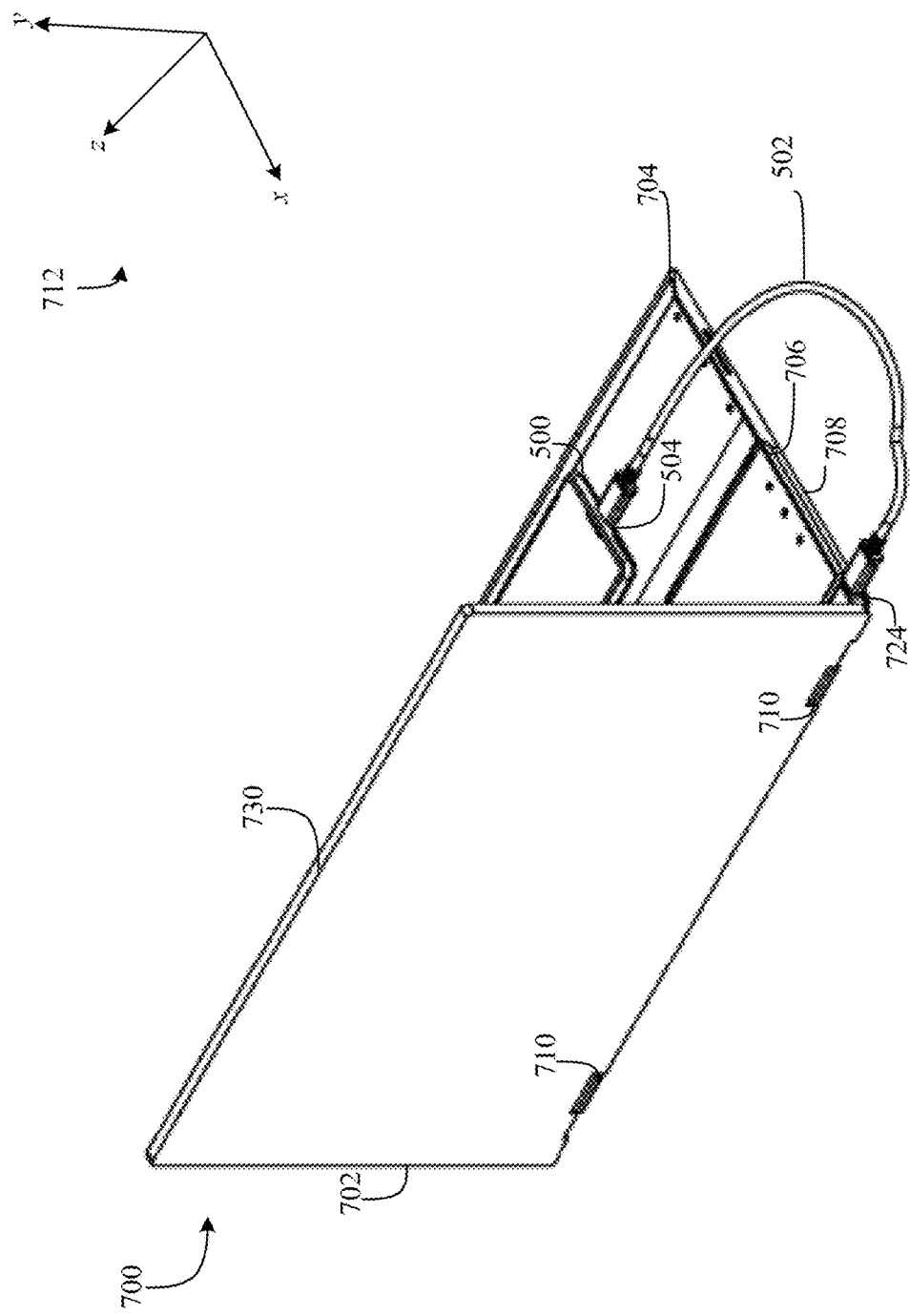
FIG. 11B illustrates a back-perspective view of an auxiliary display system in a laptop orientation according to the example of FIG. 11A.
Figure 11C:
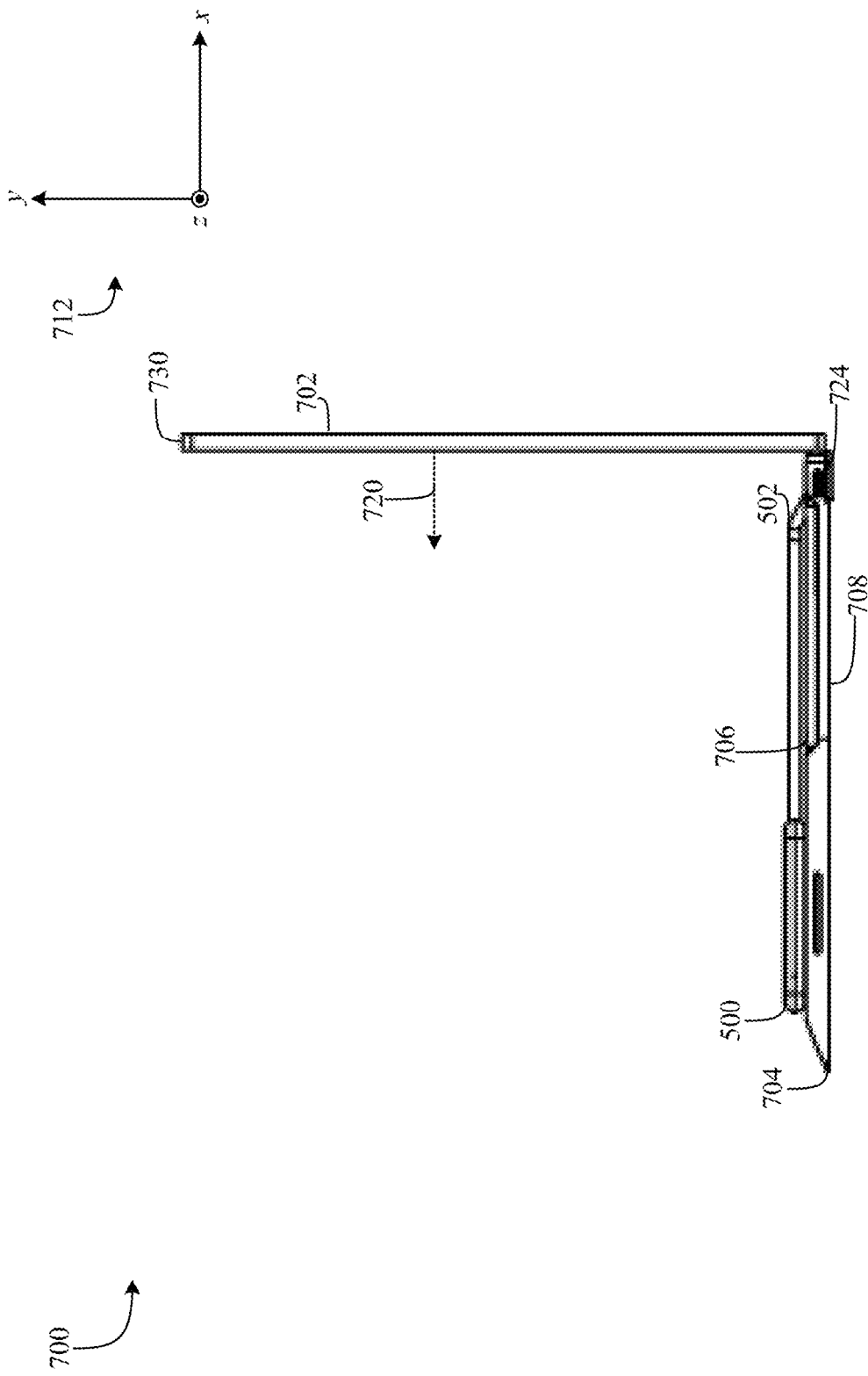
FIG. 11C illustrates a right-side view of an auxiliary display system in a laptop orientation according to the example of FIG. 11A.
Figure 11D:
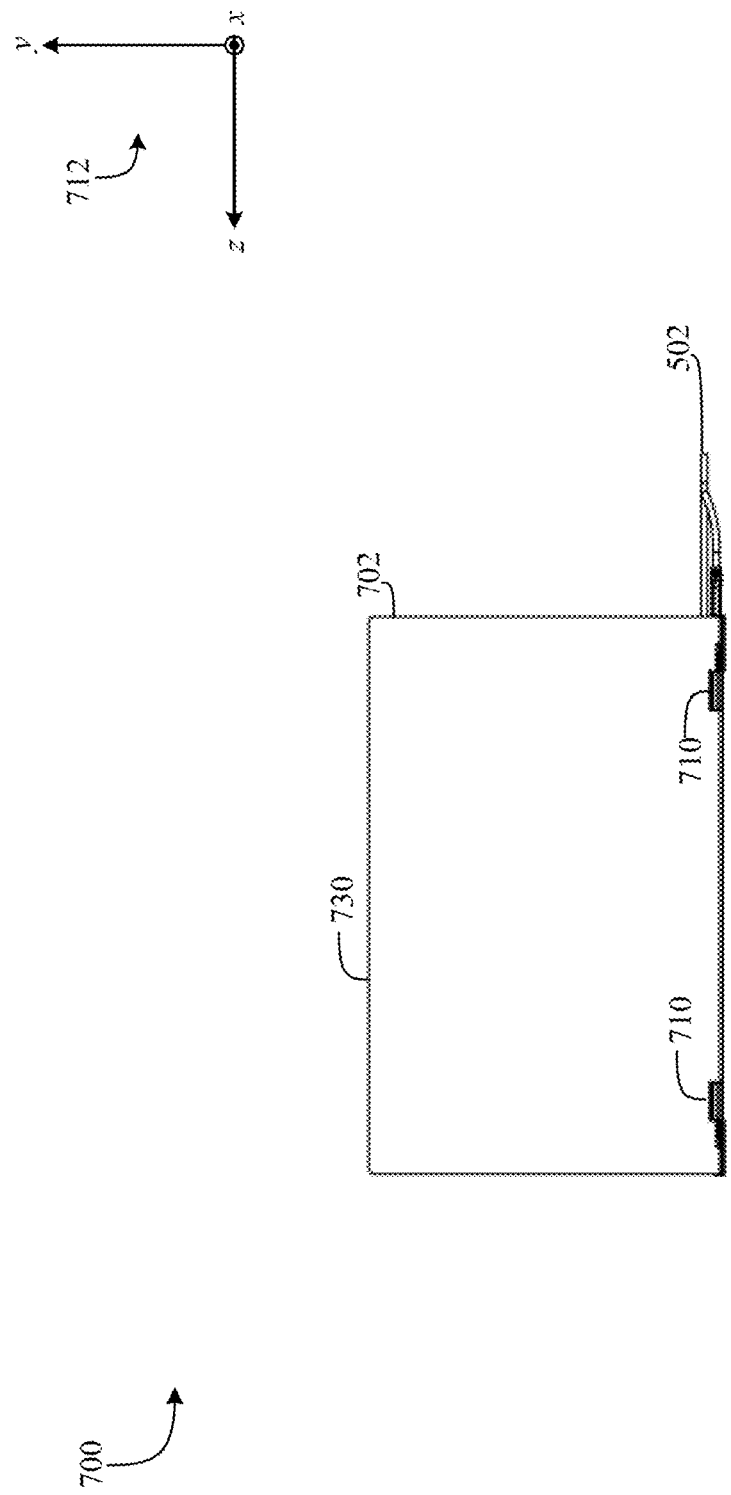
FIG. 11D illustrates a back view of an auxiliary display system in a laptop orientation according to the example of FIG. 11A.

The auxiliary display system 700 may also be deployed in a laptop orientation. FIG. 11A illustrates a front-perspective view of the auxiliary display system 700 in a laptop orientation according to an example. FIG. 11B illustrates a back-perspective view of the auxiliary display system 700 in the laptop orientation of FIG. 11A according to an example. FIG. 11C illustrates a right-side view of the auxiliary display system 700 in the laptop orientation of FIG. 11A according to an example. FIG. 11D illustrates a back view of the auxiliary display system 700 in the laptop orientation of FIG. 11A according to an example.

The laptop orientation of FIGS. 11A-11D is similar to the configuration illustrated in FIG. 5, above. As illustrated in FIGS. 11A-11D, the auxiliary display system 700 is communicatively and electrically coupled to the mobile communication device 500 via a wired connection 502 in the illustrated example, although in other examples, the auxiliary display system 700 may be communicatively and electrically coupled to other electronic devices, such as laptop computers, tablet computers, and so forth. The mobile communication device 500 may optionally be placed on the auxiliary display system 700, such as on the mount 704, as illustrated in FIGS. 11A-11D, but the mobile communication device 500 may be otherwise physically decoupled from the auxiliary display system 700.

The auxiliary display system 700 may receive and/or exchange power and/or information with the mobile communication device 500 via the wired connection 502. For example, the wired connection 502 may be connected to the wired connection port 724 and to a corresponding wired connection port 504 of the mobile communication device 500 to enable communication between the auxiliary display system 700 and the mobile communication device 500. The back surface 728 of the mount 704 rests on a surface that the auxiliary display system 700 is placed upon. The mount 704 may be co-planar with the surface that the auxiliary display system 700 is placed upon, in a similar manner as the laptop computer 200. The display portion 702 may be re-oriented about the z-axis via the first hinges 710 as desired by a user.

In some examples, the auxiliary display system 700 may operate substantially as an auxiliary display configured to display information provided by a connected device. In other examples, the auxiliary display system 700 may execute functionality similar to that of a laptop computer. For example, in the example provided with respect to FIGS. 11A-11D, the mobile communication device 500 may execute an operating system that enables the auxiliary display system 700 to execute computer programs in a similar manner as a laptop computer. The auxiliary display system 700 may include input devices or components, such as a keyboard coupled to or embedded in the linkage bar 706 and/or a touch-sensitive surface coupled to or embedded in the mount 704, such that a user may provide inputs to the auxiliary display system 700 in a similar manner as the keyboard and touch-sensitive pad implemented in the laptop computer 200. In some examples, inputs may be provided via the display portion 702, such as in examples in which the display portion 702 includes a touch-sensitive display. In some examples, the mobile communication device 500 may include a touch-sensitive screen that may be used to provide touch inputs to the auxiliary display system 700. Information (for example, user input information, display information, and so forth) may be exchanged between the auxiliary display system 700 and the mobile communication device 500 via the wired connection 502.

Figure 12A:
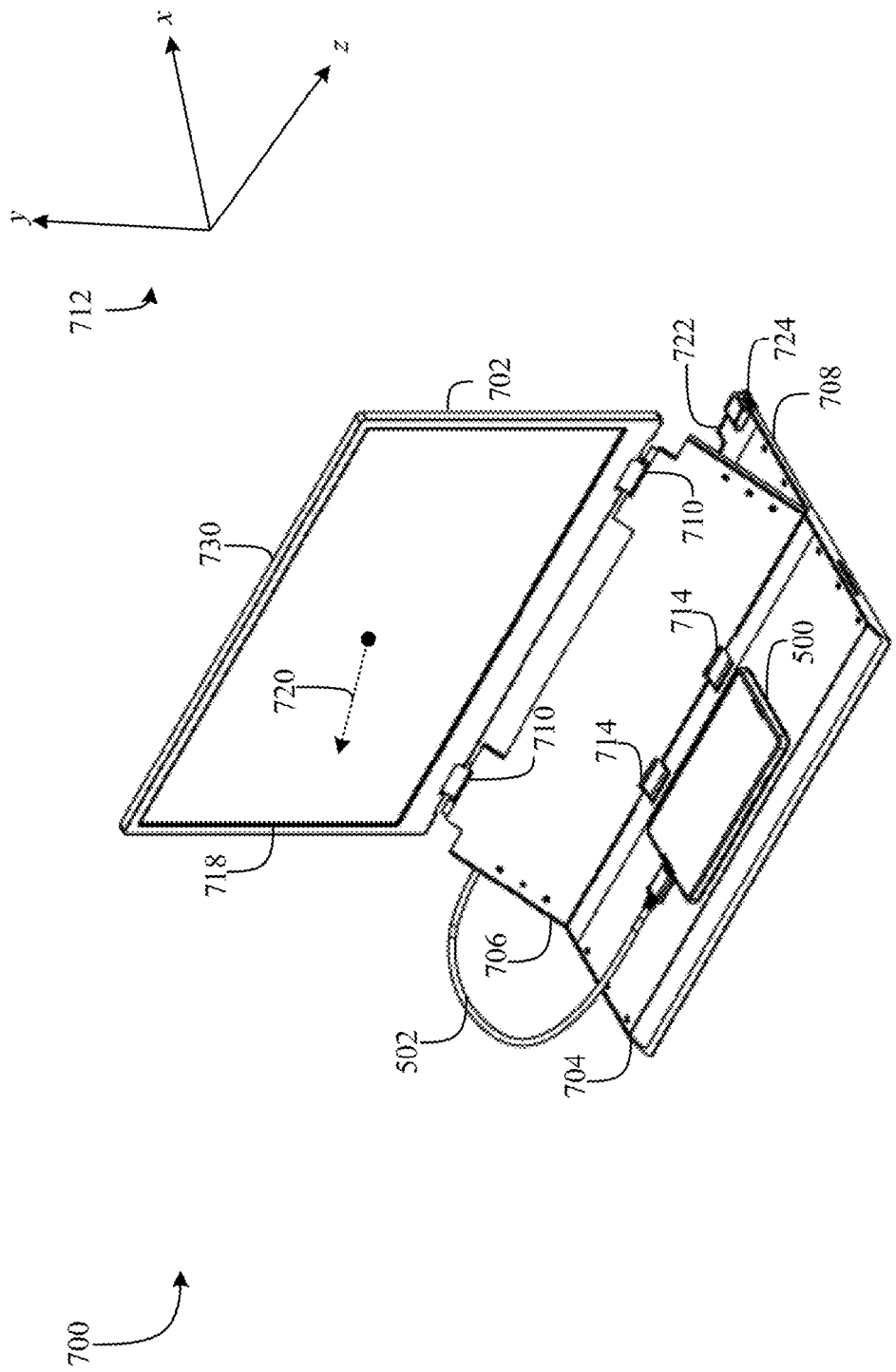
FIG. 12A illustrates a front-perspective view of an auxiliary display system in a laptop orientation according to another example.
Figure 12B:
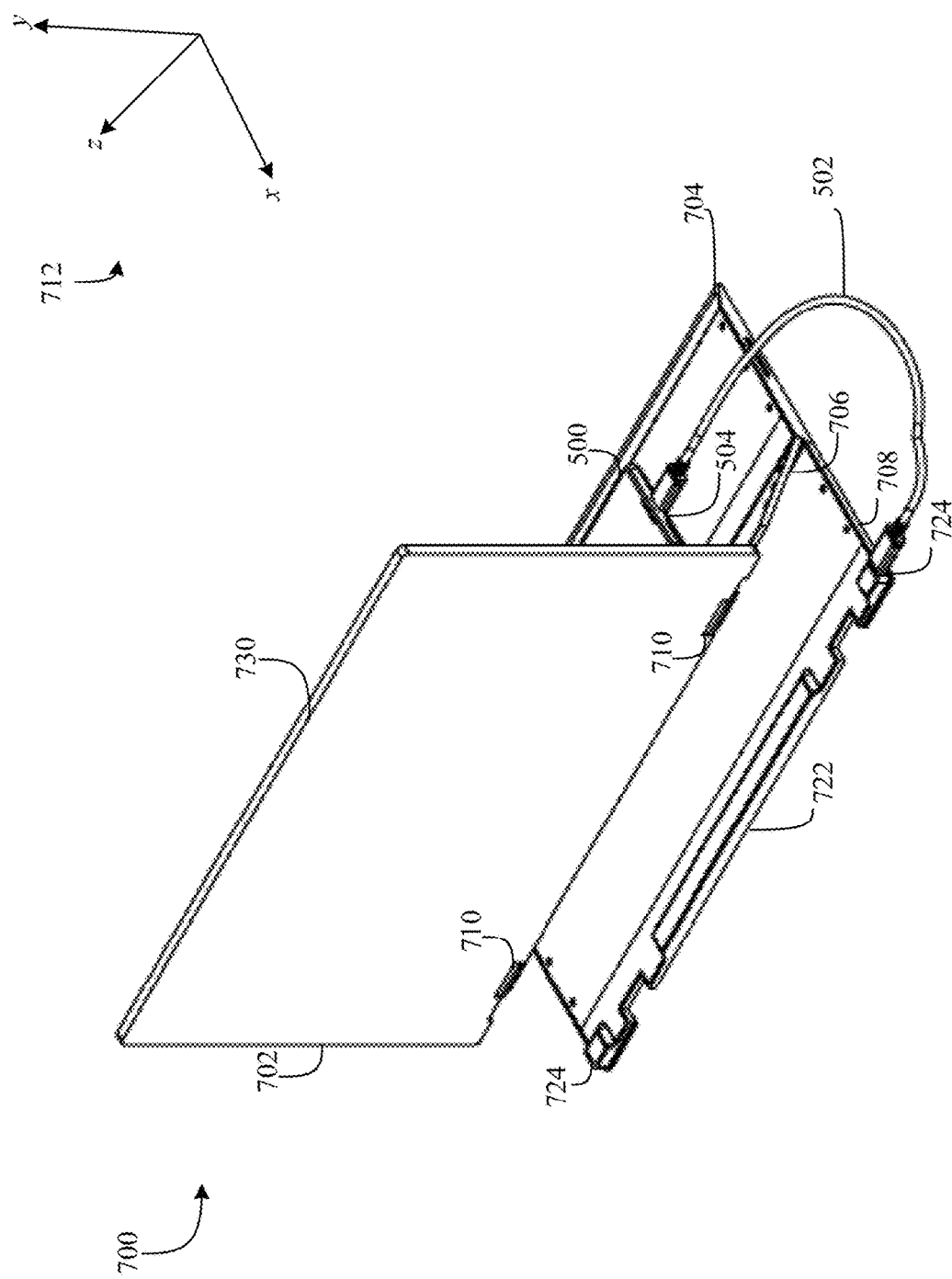
FIG. 12B illustrates a back-perspective view of an auxiliary display system in a laptop orientation according to the example of FIG. 12A.
Figure 12C:
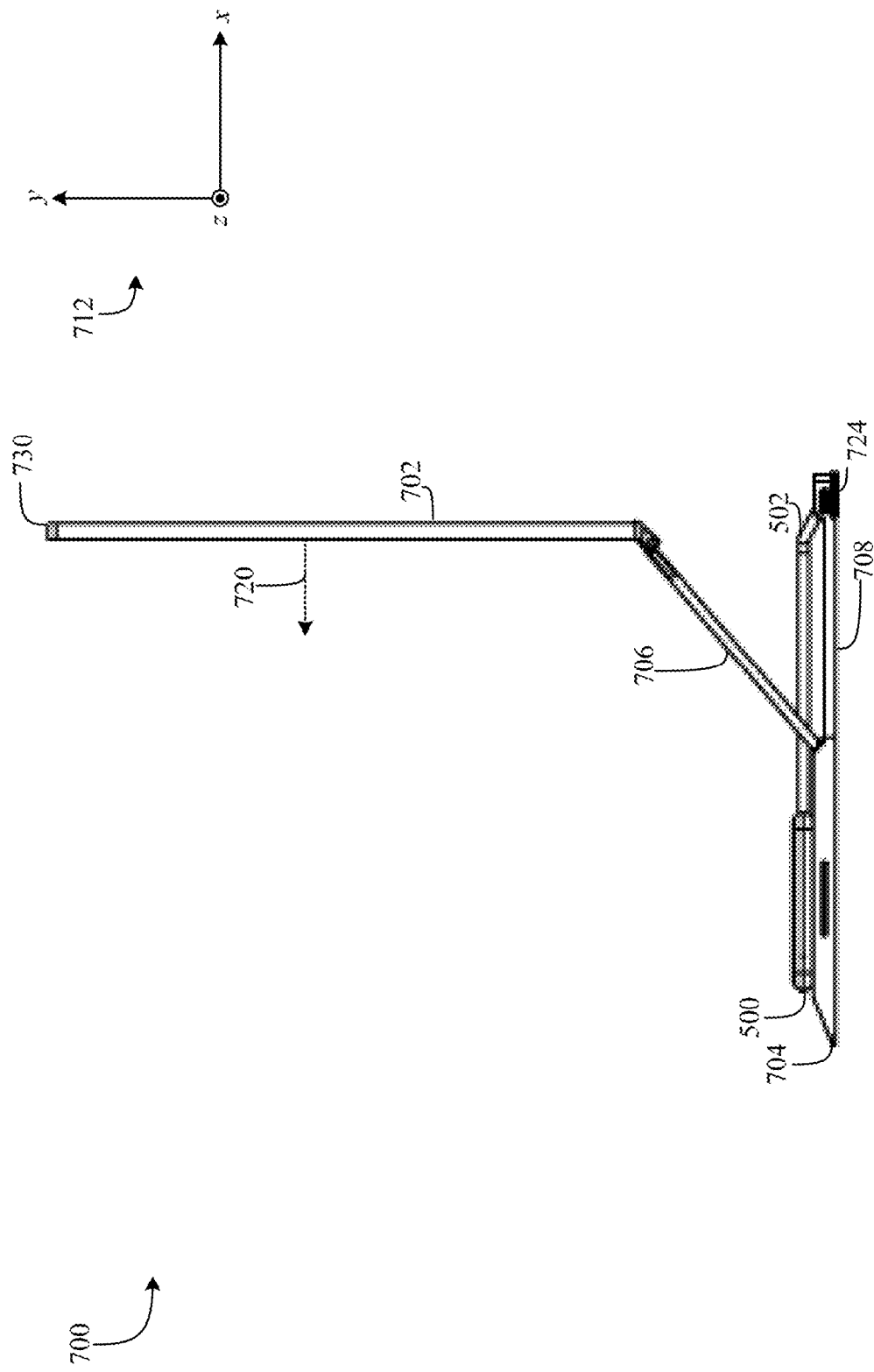
FIG. 12C illustrates a right-side view of an auxiliary display system in a laptop orientation according to the example of FIG. 12A.
Figure 12D:
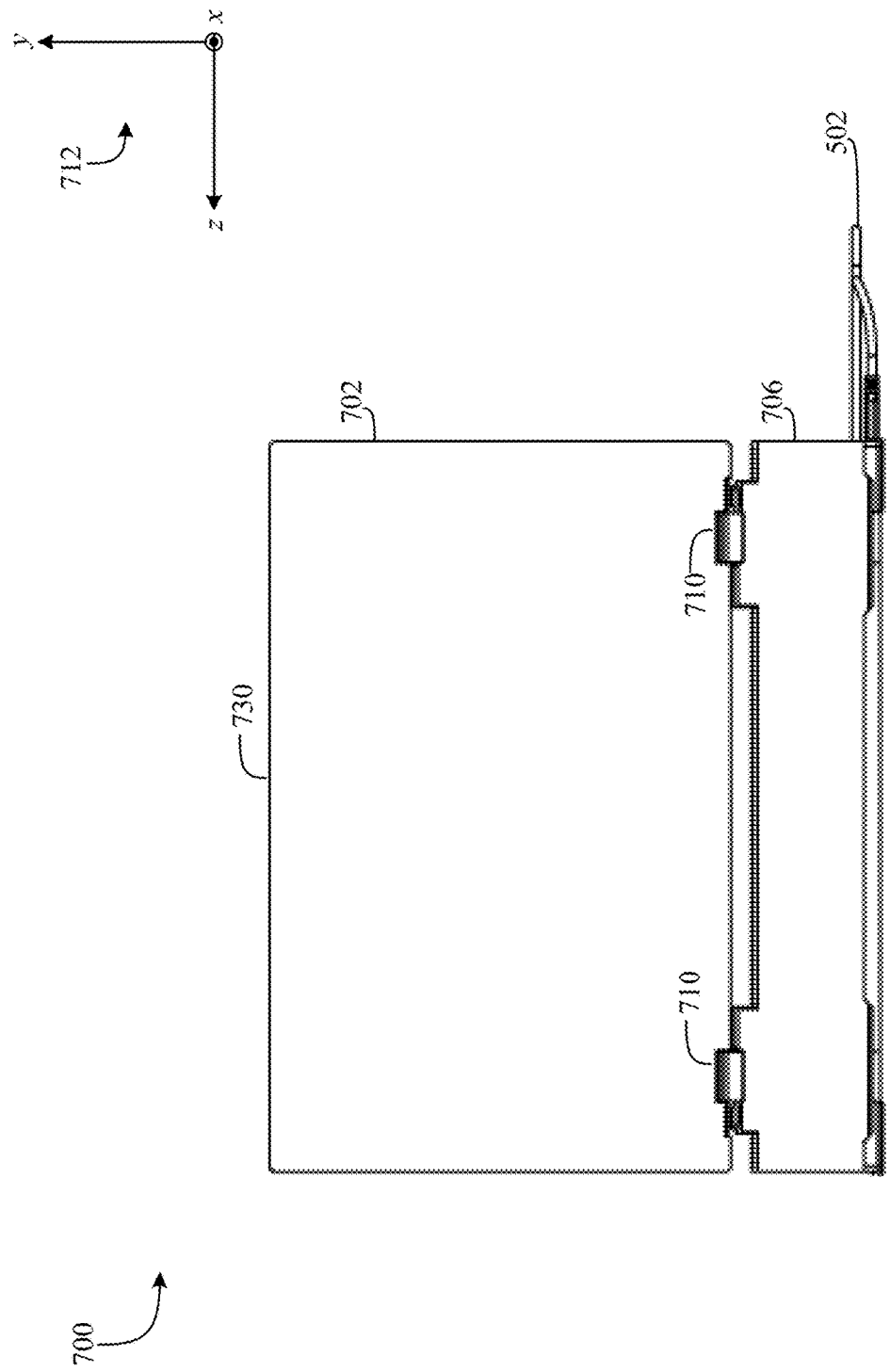
FIG. 12D illustrates a back view of an auxiliary display system in a laptop orientation according to the example of FIG. 12A.

As discussed above, the display portion 702 may be rotatable about the first hinges 710 while the auxiliary display system 700 is in the laptop orientation. Similarly, the support 708 may be rotatable about the third hinges 716 in the laptop orientation, and the linkage bar 706 may be rotatable about the second hinges 714 in the laptop orientation. For example, FIG. 12A illustrates a front-perspective view of the auxiliary display system 700 in a laptop orientation according to another example. FIG. 12B illustrates a back-perspective view of the auxiliary display system 700 in a laptop orientation according to the example of FIG. 12A. FIG. 12C illustrates a right-side view of the auxiliary display system 700 in a laptop orientation according to the example of FIG. 12A. FIG. 12D illustrates a back view of the auxiliary display system 700 in a laptop orientation according to the example of FIG. 12A.

As illustrated in FIGS. 12A-12D, the linkage bar 706 may be rotated about the z-axis via the second hinges 714 in the laptop orientation to elevate the auxiliary display system 700 away from a surface on which the auxiliary display system 700 is placed. As discussed above, the second hinges 714 may include torque hinges such that an angle to which the linkage bar 706 is rotated may be maintained. For example, the second hinges 714 may be configured to resist a gravitational moment about the second hinges 714 such that the linkage bar 706 is capable of maintaining a desired angle. Furthermore, as discussed above, the support 708 may be rotated to a desired angle about the third hinges 716 in addition to, or in lieu of, rotating the linkage bar 706 about the second hinges 714.

At least one auxiliary display system has been disclosed. The auxiliary display system is capable of receiving input information from a user and providing output information to a user. The auxiliary display system increases the physical footprint of an associated device, such as a laptop computer, by a marginal amount, while providing significant benefits in the amount of information that can be exchanged between the user and the combination of the associated device and the auxiliary display system. The auxiliary display system also expands the functionality of the associated device, such as by allowing the auxiliary display system to be used in a similar manner as a tablet computer, laptop computer, and so forth.

No limitation of the auxiliary display system is meant to be implied by the word "auxiliary." The auxiliary display system may be used even when an associated device is in an idle or sleep mode such that the auxiliary display system is the only active device. For example, where the associate device is a laptop computer, the laptop computer may be closed and in a sleep mode while the user continues to use the auxiliary display system. Furthermore, no limitation is meant to be implied by the word "display." Although some examples of the auxiliary display system are capable of displaying output information, some examples of the auxiliary display system are also capable of receiving input information from a user, such as via touch inputs. In alternate examples, the auxiliary display system is only capable of displaying information to a user, and receiving information via the associated device, but incapable of receiving touch inputs from a user.

The auxiliary display system may be any size and may have any desired dimensions. Although some of the foregoing examples illustrate the auxiliary display system as having a smaller screen area than that of the corresponding device, such as the laptop computer 200, in alternate examples, the auxiliary display system may have a display area that is larger than that of the corresponding laptop computer.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An auxiliary display system comprising:
   a mount;
   one or more coupling elements coupled to the mount and configured to be coupled to a computing device configured to rotate about a first rotation axis, wherein the one or more coupling elements non-rotatably couple the mount to the computing device such that the mount does not rotate relative to the computing device; and
   a display portion configured to rotate about the first rotation axis responsive to rotation of the computing device about the first rotation axis, the display portion including:
      a communications interface configured to be communicatively coupled to the computing device;
      a display screen configured to display output information; and
      at least one hinge enabling the display portion to be capable of rotating about a second rotation axis, the second rotation axis being parallel to the first rotation axis.

2. The auxiliary display system of claim 1, wherein the at least one hinge is at least one first hinge, the auxiliary display system further comprising a linkage bar rotatably coupled to the display portion about the at least one first hinge and rotatably coupled to the mount about at least one second hinge.

3. The auxiliary display system of claim 2, wherein the at least one second hinge enables the linkage bar to be capable of rotating about a third rotation axis, the third rotation axis being parallel to the first rotation axis and the second rotation axis.

4. The auxiliary display system of claim 3, further comprising a support rotatably coupled to the mount about at least one third hinge.

5. The auxiliary display system of claim 4, wherein the support is configured to exert a moment about the computing-device hinges opposite a gravitational moment about the computing-device hinges.

6. The auxiliary display system of claim 5, wherein the at least one third hinge enables the support to be capable of rotating about a fourth rotation axis, the fourth rotation axis being parallel to the first rotation axis, the second rotation axis, and the third rotation axis.

7. The auxiliary display system of claim 2, wherein the mount includes at least one first coupling element and the linkage bar includes at least one second coupling element configured to couple to the at least one first coupling element.

8. The auxiliary display system of claim 7, wherein the at least one first coupling element and the at least one second coupling element each include at least one magnet.

9. The auxiliary display system of claim 1, wherein the at least one hinge is at least one first hinge, the auxiliary display system further comprising a support rotatably coupled to the mount about at least one second hinge.

10. The auxiliary display system of claim 9, wherein the support is configured to exert a moment about the computing-device hinges opposite a gravitational moment about the computing-device hinges.

11. The auxiliary display system of claim 10, wherein the at least one second hinge enables the support to be capable of rotating about a third rotation axis, the third rotation axis being parallel to the first rotation axis and the second rotation axis.

12. A method of facilitating use of an auxiliary display system, the method comprising:
providing an auxiliary display including:
a mount;
one or more coupling elements coupled to the mount and configured to be coupled to a computing device configured to rotate about a first rotation axis, wherein the one or more coupling elements non-rotatably couple the mount to the computing device such that the mount does not rotate relative to the computing device; and
a display portion configured to rotate about the first rotation axis responsive to rotation of the computing device about the first rotation axis, the display portion including:
a communications interface configured to be communicatively coupled to the computing device;
a display screen configured to display output information; and
at least one hinge enabling the display portion to be capable of rotating about a second rotation axis, the second rotation axis being parallel to the first rotation axis;
instructing a user of the auxiliary display to establish a communicative connection between the communications interface and the computing device; and
instructing the user of the auxiliary display to couple the one or more coupling elements to the computing device.

13. The method of claim 12, wherein the at least one hinge is at least one first hinge, and wherein the auxiliary display further comprises a linkage bar rotatably coupled to the display portion about the at least one first hinge and rotatably coupled to the mount about at least one second hinge which enables rotation about a third rotation axis, the method further comprising instructing the user of the auxiliary display to rotate the display portion about the second rotation axis via the at least one first hinge.

14. The method of claim 13, further comprising instructing the user of the auxiliary display to rotate the display portion about the third rotation axis via the at least one second hinge, wherein the third rotation axis is parallel to the first rotation axis and the second rotation axis.

15. The method of claim 14, wherein the auxiliary display further comprises a support rotatably coupled to the mount via at least one third hinge enabling rotation about a fourth rotation axis parallel to the first rotation axis, the second rotation axis, and the third rotation axis, the method further comprising instructing the user of the auxiliary display to rotate the support about the fourth rotation axis via the at least one third hinge.

16. The method of claim 13, wherein the mount includes at least one first coupling element and the linkage bar includes at least one second coupling element configured to couple to the at least one first coupling element, the method further comprising instructing the user to removably couple the mount to the linkage bar via the at least one first coupling element and the at least one second coupling element.

17. The method of claim 16, wherein instructing the user to removably couple the mount to the linkage bar via the at least one first coupling element and the at least one second coupling element includes instructing the user to rotate at least one of the linkage bar or the mount about the third rotation axis via the at least one second hinge.

18. An auxiliary display system, the system comprising:
a computing device including:
a first communications interface;
a primary display screen;
a backplane surface; and
at least one computing device hinge enabling rotation of the primary display screen about a first rotation axis; and
an auxiliary display configured to rotate about the first rotation axis responsive to rotation of the primary display screen about the first rotation axis, the auxiliary display including:
a mount configured to be coupled to the backplane surface of the computing device, wherein the mount is non-rotatably coupled to the computing device such that the mount does not rotate relative to the computing device;
a second communications interface configured to be communicatively coupled to the first communications interface;
at least one auxiliary display screen configured to display output information, and being configured to be rotatably coupled to the mount such that the at least one auxiliary display screen is capable of rotating about a second rotation axis relative to the mount, the second rotation axis being parallel to the first rotation axis.

19. The auxiliary display system of claim 18, wherein the at least one hinge is at least one first hinge, the auxiliary display system further comprising a support rotatably coupled to the mount about at least one second hinge,
wherein the support is configured to exert a moment about the computing-device hinges opposite a gravitational moment about the computing-device hinges, and
wherein the at least one second hinge enables the support to be capable of rotating
about a third rotation axis, the third rotation axis being parallel to the first rotation axis and the second rotation axis.

20. The auxiliary display system of claim 18, wherein the at least one hinge is at least one first hinge, the auxiliary display further comprising a linkage bar rotatably coupled to the at least one auxiliary display screen about the at least one first hinge and rotatably coupled to the mount about at least one second hinge.

* * * * *